United States Patent
Fukuda

(10) Patent No.: US 8,988,717 B2
(45) Date of Patent: Mar. 24, 2015

(54) PRINTING APPARATUS CAPABLE OF PERFORMING PAPER ASSIGNMENT PROCESSING, METHOD OF CONTROLLING THE PRINTING APPARATUS, AND STORAGE MEDIUM

(71) Applicant: Canon Kabushiki Kaisha, Tokyo (JP)

(72) Inventor: Shin Fukuda, Kawasaki (JP)

(73) Assignee: Canon Kabushiki Kaisha (JP)

( * ) Notice: Subject to any disclaimer, the term of this patent is extended or adjusted under 35 U.S.C. 154(b) by 0 days.

(21) Appl. No.: 13/911,356

(22) Filed: Jun. 6, 2013

(65) Prior Publication Data

US 2013/0329256 A1    Dec. 12, 2013

(30) Foreign Application Priority Data

Jun. 8, 2012    (JP) .................................. 2012-130676

(51) Int. Cl.
  *G06F 3/12* (2006.01)
  *G06K 15/00* (2006.01)
  *G03G 15/00* (2006.01)

(52) U.S. Cl.
  CPC ........ *G06K 15/4065* (2013.01); *G06K 15/4025* (2013.01); *G03G 15/6508* (2013.01)
  USPC ......... 358/1.15; 358/1.12; 358/1.1; 358/1.13; 358/1.16; 358/1.18; 399/389; 399/370; 399/376; 399/391; 271/9.05; 271/9.06; 271/9.09

(58) Field of Classification Search
  USPC ......... 358/1.15, 1.12, 1.1; 399/389, 370, 376, 399/391; 271/9.05, 9.06, 9.09
  See application file for complete search history.

(56) References Cited

U.S. PATENT DOCUMENTS

| | | | |
|---|---|---|---|
| 5,199,694 A * | 4/1993 | Iseda ............................ | 271/9.05 |
| 2006/0285900 A1 * | 12/2006 | Kurita ........................... | 399/361 |
| 2010/0214618 A1 * | 8/2010 | Maehira ....................... | 358/3.12 |
| 2011/0261378 A1 * | 10/2011 | Taima ........................... | 358/1.12 |

FOREIGN PATENT DOCUMENTS

JP    2004-330781 A    11/2004

* cited by examiner

*Primary Examiner* — Martin Mushambo
(74) *Attorney, Agent, or Firm* — Rossi, Kimms & McDowell LLP

(57) ABSTRACT

A printing apparatus which makes it possible to reduce time and labor required by the operator for paper assignment and suppress occurrence of an operation error during execution of the paper assignment. The printing apparatus is provided with a plurality of paper feeders for containing papers. Information on types of papers to be contained in the respective paper feeders is set as a paper assignment configuration. The printing apparatus selects a specific paper assignment configuration, based on an instruction from the operator, from paper assignment configurations stored in a storage device. The selected specific paper assignment configuration is set as the current paper assignment configuration.

10 Claims, 22 Drawing Sheets

*FIG. 8*

| | PAPER ASSIGNMENT CONFIGURATION NAME: PaperAssignmentSet 2011207 | | |
|---|---|---|---|
| 801 | | | |
| | PAPER FEEDER | PAPER NAME | PAPER SIZE |
| 810 | 1 | ABC PAPER MANUFACTURING CO. C081 | A4 |
| 811 | 2 | ABC PAPER MANUFACTURING CO. C081 | A4 |
| 812 | 3 | ABC PAPER MANUFACTURING CO. C082 | A3 |
| 813 | 4 | DEF PAPER MANUFACTURING CO. PLAIN PAPER | LTR |
| 814 | 5 | DEF PAPER MANUFACTURING CO. PLAIN PAPER | LTR |
| 815 | 6 | DEF PAPER MANUFACTURING CO. GLOSSY PAPER | 11x17 |

FIG. 11A

CURRENT PAPER ASSIGNMENT CONFIGURATION

| PAPER FEEDER | PAPER NAME | PAPER SIZE |
|---|---|---|
| 1 | ABC PAPER MANUFACTURING CO. C081 | A4 |
| 2 | ABC PAPER MANUFACTURING CO. C081 | A4 |
| 3 | XYZ PAPER MANUFACTURING CO. COATED PAPER | 11x17 |
| 4 | DEF PAPER MANUFACTURING CO. PLAIN PAPER | LTR |
| 5 | ABC PAPER MANUFACTURING CO. C082 | A3 |
| 6 | DEF PAPER MANUFACTURING CO. GLOSSY PAPER | 11x17 |

FIG. 11B

READ PAPER ASSIGNMENT CONFIGURATION

| PAPER FEEDER | PAPER NAME | PAPER SIZE |
|---|---|---|
| 1 | ABC PAPER MANUFACTURING CO. C081 | A4 |
| 2 | ABC PAPER MANUFACTURING CO. C081 | A4 |
| 3 | ABC PAPER MANUFACTURING CO. C082 | A3 |
| 4 | DEF PAPER MANUFACTURING CO. PLAIN PAPER | LTR |
| 5 | DEF PAPER MANUFACTURING CO. PLAIN PAPER | LTR |
| 6 | DEF PAPER MANUFACTURING CO. GLOSSY PAPER | 11x17 |

FIG. 15

| PRINT JOB NAME | PRINTING DATE AND TIME | PRINT SETTING FILE | BITMAP DATA | PAPER ASSIGNMENT CONFIGURATION |
|---|---|---|---|---|
| COPY JOB 1 | 2010/08/13 13:52:21 JST | /Job Ticket/Copy1.xml | /Bitmap Data/Copy1.bmp | /PaperAssign/Copy1.xml |
| COPY JOB 2 | 2010/08/13 14:09:02 JST | /Job Ticket/Copy2.xml | /Bitmap Data/Copy2.bmp | /PaperAssign/Copy2.xml |
| PRINT JOB 1 | 2011/01/21 09:11:43 JST | /Job Ticket/PDL1.xml | /Bitmap Data/PDL1.bmp | /PaperAssign/PDL1.xml |
| PRINT JOB 2 | 2011/01/21 10:34:28 JST | /Job Ticket/PDL2.xml | /Bitmap Data/PDL2.bmp | /PaperAssign/PDL2.xml |
| PRINT JOB 3 | 2011/02/07 16:46:27 JST | /Job Ticket/PDL3.xml | /Bitmap Data/PDL3.bmp | /PaperAssign/PDL3.xml |

| PRINT JOB NAME | PRINTING DATE AND TIME | PAGE COUNT | COPY COUNT | TO-BE-USED PAPER |
|---|---|---|---|---|
| COPY JOB 1 | 2010/08/13 13:52:21 JST | 5 | 100 | ABC PAPER MANUFACTURING CO. C081 A4:500 |
| COPY JOB 2 | 2010/08/13 14:09:02 JST | 20 | 5 | ABC PAPER MANUFACTURING CO. C082 A4:100 |
| PRINT JOB 1 | 2011/10/21 09:11:43 JST | 20 | 30 | ABC PAPER MANUFACTURING CO. C081 A4:600 |
| PRINT JOB 2 | 2011/01/21 10:34:28 JST | 15 | 50 | DEF PAPER MANUFACTURING CO. PLAIN PAPER LTR:500 DEF PAPER MANUFACTURING CO. THICK PAPER LTR:250 |
| PRINT JOB 3 | 2011/02/07 16:46:27 JST | 1 | 500 | XYZ PAPER MANUFACTURING CO. PLAIN PAPER A3:500 |

COMPLETED PRINT JOB QUEUE

REPRINT

PRINT QUEUE

*FIG. 19*

PRINT JOB TO BE RE-EXECUTED

| PRINT JOB NAME | PRINTING DATE AND TIME | PAGE COUNT | COPY COUNT | TO-BE-USED PAPER |
|---|---|---|---|---|
| PRINT JOB 2 | 2011/01/21 10:34:28 JST | 15 | 50 | DEF PAPER MANUFACTURING CO. PLAIN PAPER LTR:500<br>DEF PAPER MANUFACTURING CO. THICK PAPER LTR:250 |

It is possible to read out the following paper assignment configuration.

| PAPER FEEDER | PAPER NAME | PAPER SIZE |
|---|---|---|
| 1 | ABC PAPER MANUFACTURING CO. C081 | A4 |
| 2 | ABC PAPER MANUFACTURING CO. C081 | A4 |
| 3 | DEF PAPER MANUFACTURING CO. PLAIN PAPER | LTR |
| 4 | DEF PAPER MANUFACTURING CO. PLAIN PAPER | LTR |
| 5 | ABC PAPER MANUFACTURING CO. C082 | A3 |
| 6 | DEF PAPER MANUFACTURING CO. THICK PAPER | LTR |

1912 ☐ DON'T READ OUT
1913 ☒ READ OUT THE SETTINGS OF ONLY PAPER FEEDERS TO WHICH PAPERS USABLE IN PRINT JOB TO BE RE-EXECUTED ARE ASSIGNED
1914 ☐ READ OUT SETTINGS OF ALL PAPER FEEDERS

[ OK ]

PRINTING APPARATUS CAPABLE OF PERFORMING PAPER ASSIGNMENT PROCESSING, METHOD OF CONTROLLING THE PRINTING APPARATUS, AND STORAGE MEDIUM

BACKGROUND OF THE INVENTION

1. Field of the Invention

The present invention relates to a printing apparatus, a method of controlling the same, and a storage medium, and more particularly to a printing apparatus control technique for managing paper assignment in a printing system.

2. Description of the Related Art

In a printing market, which is called the print-on-demand (POD) market or the production market, a form of business is adopted in which printing is performed according to an order placed by a customer and then a printout is reliably delivered to the customer on or before delivery date. In a job site in the printing market, it is very important to perform large-amount printing speedily. For this reason, in general, an operator who performs various operations on a printing apparatus as a specialist is placed in the job site. The operator as a specialist performs paper replenishment/replacement/assignment, print job management, job ticket editing, post processing including conveyance and cutting/bookbinding of a printout, and finishing. The term "paper assignment" mentioned here refers to an operation performed by the operator so as to assign replenished or replaced papers to paper feeders of the printing apparatus.

The printing apparatus determines what type of papers are contained in which paper feeder, based on paper information on papers assigned to the paper feeders. Paper replenishment/replacement/assignment is a most important task among operator operations. This is because when paper replenishment/replacement/assignment is not properly performed, the printing apparatus is brought into a state where required papers have run out, during execution of a print job. In this case, the printing apparatus has to temporarily stop its print engine to suspend a printing process. When the printing process is suspended, printing cannot be restarted until replenishment/replacement/assignment of required papers is completed. Further, reheating of the print engine and the like processing are executed after restart of the printing, and hence it takes long before the printing is enabled again (this event will be hereinafter referred to as "time loss"). An operator has to complete paper replenishment/replacement/assignment before start of printing according to a print job to be executed, so as to prevent occurrence of the time loss.

On the other hand, in recent years, the needs of customers have diversified, and in accordance with this diversification, the types of papers available for printing have also diversified. For this reason, in assignment of papers to a paper feeder, the operator needs to select a type of papers for assignment from many paper types, and therefore an operation error is more likely to occur. To cope with this situation, there has been proposed a method in which candidate types of papers for assignment are narrowed down according to a print job to be executed (see e.g. Japanese Patent Laid-Open Publication No. 2004-330781). In this method, only papers (paper types) that can be used by a print job to be executed are displayed as candidates for paper assignment, which makes it possible to reduce a possibility that an operator will make an error in paper assignment.

As described above, the operator checks what type of papers are to be supplied to which paper feeder for paper replenishment or replacement, according to a print job to be executed, and then paper assignment is performed based on the result of the check. For this reason, even in the case of performing reprinting, the operator has to check what type of papers are to be supplied to which paper feeder for paper replenishment or replacement, and then carries out paper assignment again. This operator operation requires time and labor. Further, there is a fear that an operation error occurs during execution of paper reassignment by the operator.

SUMMARY OF THE INVENTION

The present invention provides a printing apparatus which makes it possible to reduce time and labor required for an operator to execute paper assignment and suppress occurrence of an operation error during execution of the paper assignment, a method of controlling the printing apparatus, and a storage medium.

In a first aspect of the present invention, there is provided a printing apparatus provided with a plurality of paper feeders for containing papers, comprising a setting unit configured to set information on types of papers contained in the respective paper feeders, as a paper assignment configuration, a storage unit configured to store paper assignment configurations set by the setting unit, and a selection unit configured to select a specific paper assignment configuration, based on a user instruction, from the paper assignment configurations stored in the storage unit, wherein the setting unit sets the specific paper assignment configuration selected by the selection unit, as a current paper assignment configuration.

In a second aspect of the present invention, there is provided a method of controlling a printing apparatus provided with a plurality of paper feeders for containing papers, comprising setting information on types of papers contained in the respective paper feeders, as a paper assignment configuration, storing paper assignment configurations set by said setting in a storage unit, selecting a specific paper assignment configuration, based on a user instruction, from the paper assignment configurations stored in the storage unit, and setting the specific paper assignment configuration selected by said selecting, as a current paper assignment configuration.

In a third aspect of the present invention, there is provided a non-transitory computer-readable storage medium storing a computer-executable program for causing a computer to execute a method of controlling a printing apparatus provided with a plurality of paper feeders for containing papers, wherein the method comprises setting information on types of papers contained in the respective paper feeders, as a paper assignment configuration, storing paper assignment configurations set by said setting in a storage unit, selecting a specific paper assignment configuration, based on a user instruction, from the paper assignment configurations stored in the storage unit, and setting the specific paper assignment configuration selected by said selecting, as a current paper assignment configuration.

According to the present invention, the operator becomes capable of reading out a stored paper assignment configuration in desired timing, and hence it is possible to reduce time and labor required by the operator for paper assignment to thereby improve user friendliness of the apparatus.

Further features of the present invention will become apparent from the following description of exemplary embodiments with reference to the attached drawings.

BRIEF DESCRIPTION OF THE DRAWINGS

FIG. 8 is a schematic diagram of an example of a paper assignment configuration stored in an HDD in a step of FIG. 7.

FIG. 11A is a diagram of an example of the current paper assignment configuration.

FIG. 11B is a diagram of an example of a paper assignment configuration that is read out.

FIG. 15 is a diagram illustrating, by way of example, how print jobs are held in a completed print job queue.

FIG. 16 is a view of an example of a completed print job queue screen used by the operator for executing reprinting of a print job held in the completed print job queue.

FIG. 19 is a view of an example of a reprinting print job screen used in a fifth embodiment of the present invention by an operator to designate whether or not to read out settings of a paper assignment configuration which are associated with a print job to be re-executed.

DESCRIPTION OF THE EMBODIMENTS

The present invention will now be described in detail below with reference to the accompanying drawings showing embodiments thereof.

Figure 1:
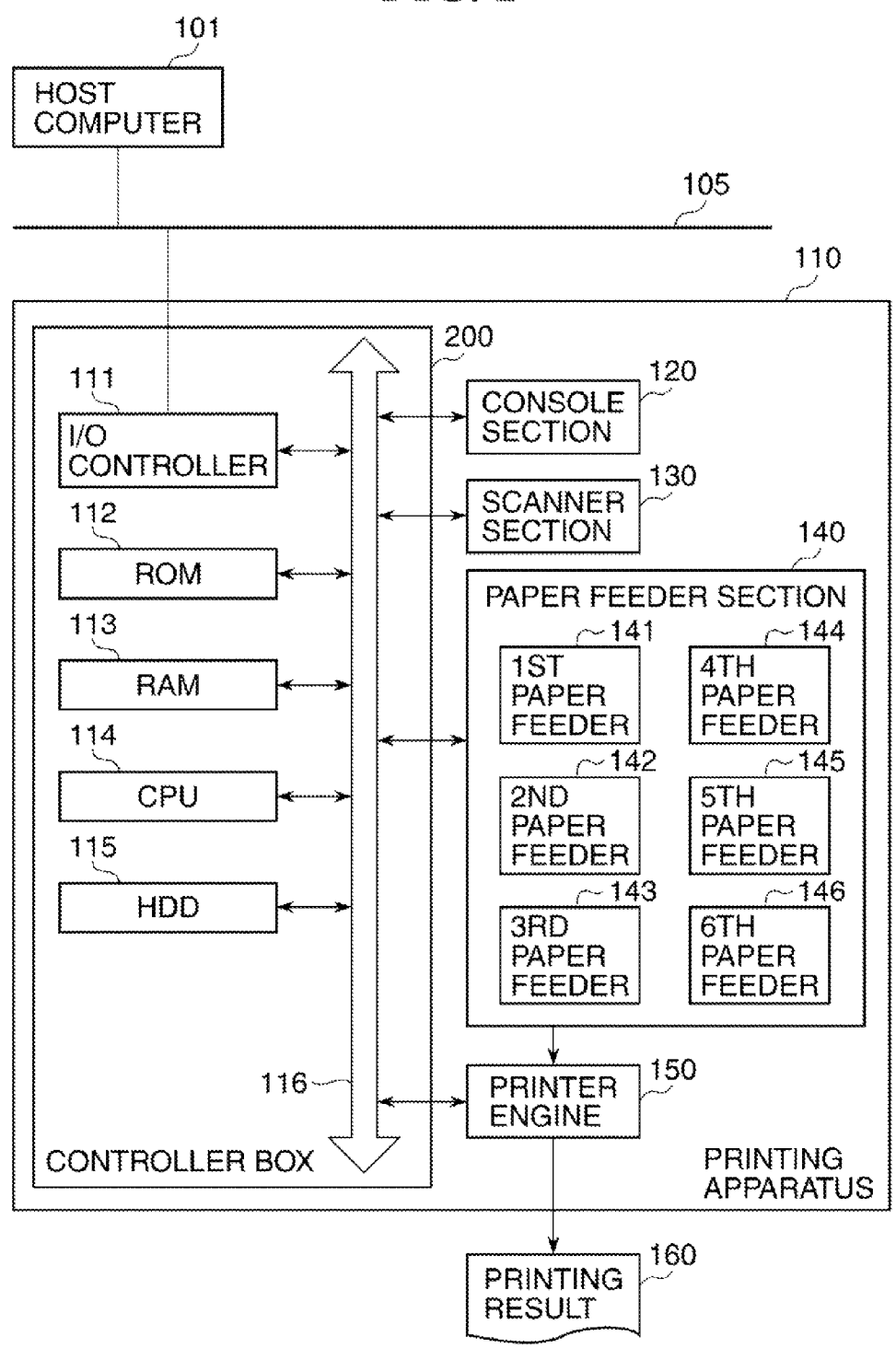
FIG. 1 is a schematic block diagram of the hardware configuration of a printing system including a printing apparatus according to a first embodiment of the present invention.

FIG. 1 is a schematic block diagram of the hardware configuration of a printing system including a printing apparatus according to a first embodiment of the present invention.

As shown in FIG. 1, the printing system including the printing apparatus according to the present embodiment comprises a host computer 101 and the printing apparatus 110. The host computer 101 and the printing apparatus 110 are interconnected by a communication line 105. Although in the present embodiment, the printing system comprises the host computer 101 and the printing apparatus 110, a plurality of computers and printing apparatuses may be connected to the communication line 105.

The host computer 101 is capable of generating a print job based on information input by an operator (or a user or a manager) via an input device, not shown, and transmitting the generated print job to the printing apparatus 110. The printing apparatus 110 comprises a controller box 200, a console section 120, a scanner section 130, a paper feeder section 140, and a printer engine 150.

The controller box 200 performs various kinds of data processing and controls the operation of the printing apparatus 110. The console section 120 is provided with a touch panel and receives various operations from the operator via the touch panel. The scanner section 130 scans an original document using an optical sensor and acquires scanned image data. The paper feeder section 140 comprises a plurality of paper feeders. The printer engine 150 physically prints image data on a print paper. Reference numeral 160 denotes a printing result obtained by printing.

Next, a description will be given of the configuration of the controller box 200.

The controller box 200 comprises an input and output (I/O) controller 111, a ROM 112, a RAM 113, a CPU 114, a HDD 115, and a system bus 116.

The input and output controller 111 controls communication with an external network (communication line 105). The ROM (read only memory) 112 stores various kinds of control programs. The RAM (random access memory) 113 reads out and records the control programs stored in the ROM 112. The CPU 114 executes the control programs loaded in the RAM 113 from the ROM 112 and performs centralized overall control of image signals and various kinds of data. The HDD 115 is a storage device used for storing large-volume data, such as image data and print data, temporarily or on a long term basis. The modules in the controller box 200 are connected to each other via the system bus 116. Further, the system bus 116 connects between the devices in the controller box 200 and the other devices in the printing apparatus 110. Note that the RAM 113 also functions as a main memory and a work area for the CPU 114. The control programs and an operating system are stored not only in the ROM 112 but also in the HDD 115. The controller box 200 may be provided with a NVRAM, not shown, for storing printing apparatus mode configuration information from the console section 120.

The paper feeder section 140 comprises a plurality of paper feeders, as mentioned hereinbefore. The paper feeders forming the paper feeder section 140 include not only paper feeders provided in the printing apparatus 110 but also an external paper feeder as an option and a manual paper feeder. In the present embodiment, it is assumed that there are provided a total of six paper feeders, i.e. first to sixth paper feeders 141 to 146. Each paper feeder is capable of containing print papers, and separately conveying only an uppermost one of the contained papers to the printer engine 150.

Figure 2:
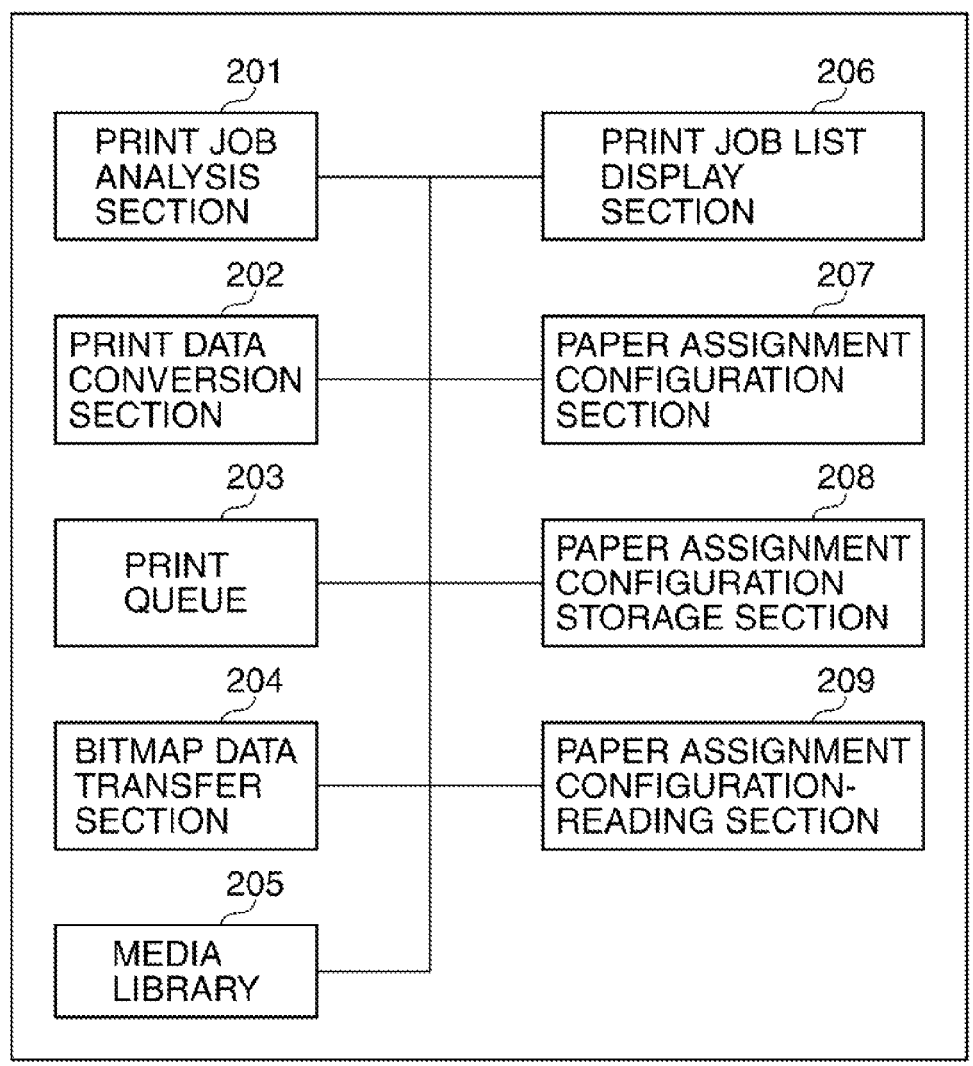
FIG. 2 is a block diagram of the software configuration of the printing apparatus.

FIG. 2 is a block diagram of the software configuration of the printing apparatus 110 in the printing system shown in FIG. 1. The software modules appearing in FIG. 2 are stored in the ROM 112 of the controller box 200, or in the HDD 115, and are each read into the RAM 113, as required, for execution by the CPU 114.

A print job analysis section 201 is a module that analyzes various kinds of print jobs received by the printing apparatus 110. The print jobs include print jobs sent from the host computer 101 and copy jobs generated in the printing apparatus 110, and the print job analysis section 201 reads out print settings from each print job. The print settings mentioned here basically include settings of a size and a type of papers to be used for printing, settings of paper feeding, such as a paper feeder, a setting of single-sided printing or double-sided printing, and settings of finishing processing, such as stapling and bookbinding. The print settings read out by the print job analysis section 201 are temporality stored in a storage device, such as the RAM 113 or the HDD 115.

A print data conversion section 202 is a module configured to convert print image data contained in each of the various kinds of print jobs received by the printing apparatus 110 to bitmap data printable by the printer engine 150. Print image data sent from the host computer 101 is generally written e.g. in page description language (PDL), and the PDL data is converted to bitmap data. In a case where print image data has been converted to bitmap data in advance e.g. in the host computer 101, the print data conversion section 202 performs only color conversion in which the print image data is converted to color space values compatible with the printer engine 150. On the other hand, in the case of a copy job generated in the printing apparatus 110, scanned image data read by the scanner section 130 is converted to bitmap data. Bitmap data generated by the print data conversion section 202 is temporality stored in a storage device, such as the RAM 113 or the HDD 115.

All the print jobs received by the printing apparatus 110 are processed by the print job analysis section 201 and the print data conversion section 202, and at the same time, information on each print job is sent to a print queue 203 where the print jobs are managed in a centralized manner. In the print queue 203, the printing order of the managed print jobs is controlled, and the print jobs are sequentially subjected to printing in a predetermined order.

A bitmap data transfer section 204 is a module configured to transfer bitmap data generated by the print data conversion section 202 to the printer engine 150 in timing in which a print paper is conveyed from the paper feeder section 140 to the printer engine 150.

A media library 205 manages paper information handled by the printing apparatus 110. The paper information is stored in the form of a database in the HDD 115, and the media library 205 writes and reads data in and from the database stored in the HDD 115. In the paper information database, papers (paper types) for general use are registered in advance before shipment of the printing apparatus 110. Further, an operator or the like user can add or delete paper information items to/from the paper information database or edit data of the paper information database.

A print job list display section 206 displays print jobs in a list form on the console section 120. When the print jobs are displayed in a list form by the print job list display section 206, the operator checks the printing status of a print job or designates various operations to be performed on the print job.

A paper assignment configuration section 207 is a module configured to assign paper information of papers to each of the first to sixth paper feeders 141 to 146, which contains the papers. The paper information item to be assigned is selected from the paper information database in the media library 205 by the operator.

A paper assignment configuration storage section 208 is a module configured to store in the HDD 115 a paper assignment configuration set by the paper assignment configuration section 207. A plurality of paper assignment configurations can be stored in the HDD 115, and when a paper assignment configuration is to be stored in the HDD 115, the paper assignment configuration is assigned an identifier for identifying the paper assignment configuration.

A paper assignment configuration-reading section 209 is a module configured to read out and set a paper assignment configuration stored in the paper assignment configuration storage section 208, as the current paper assignment configuration. A paper assignment configuration to be set as the current paper assignment configuration is designated by the operator.

Next, a description will be given of a print job management screen on which the operator checks print jobs held in the print queue 203 or carries out a job operation, such as a cancellation or an interrupt, in the printing system shown in FIG. 1.

Figure 3:
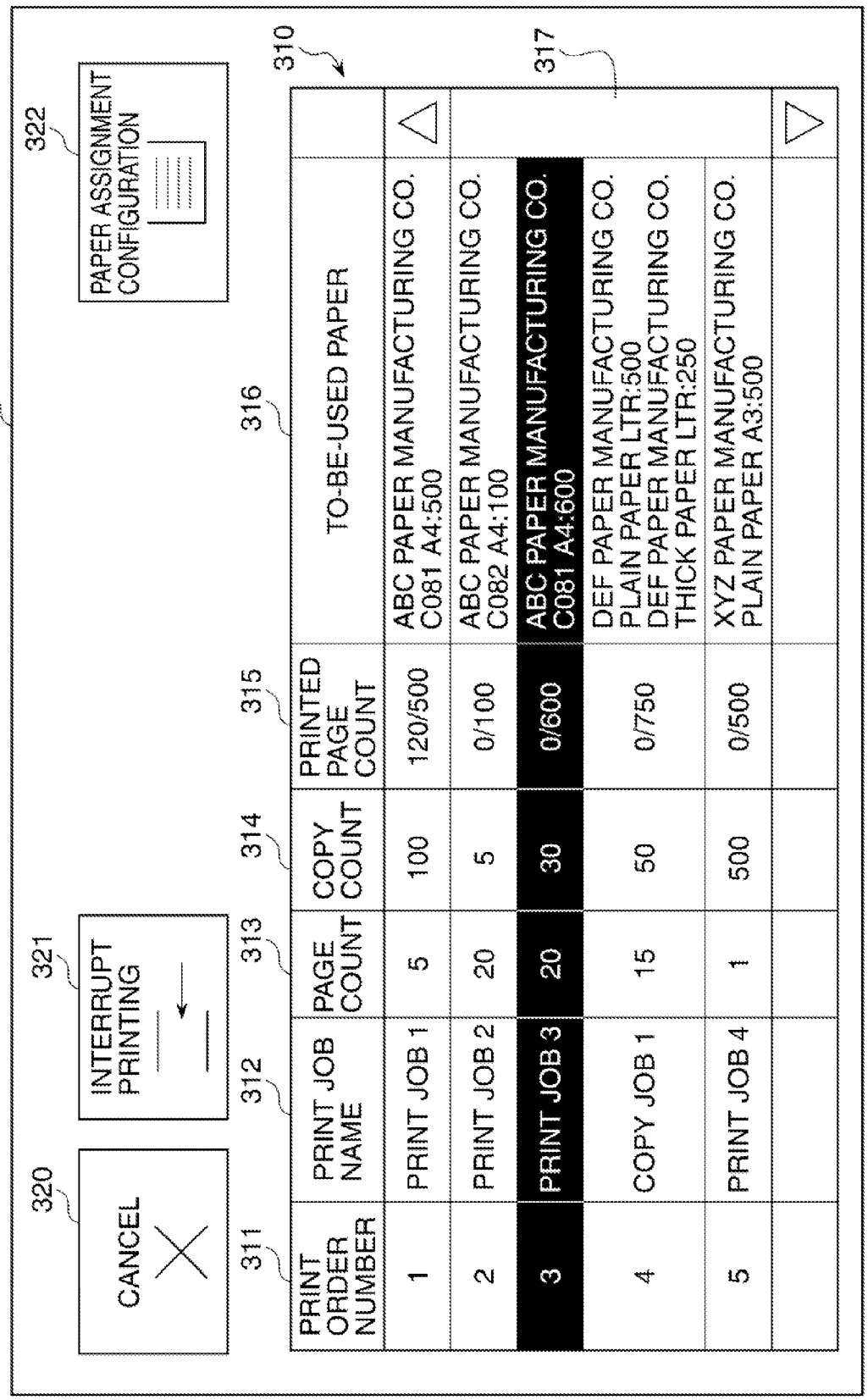
FIG. 3 is a view of an example of a print job management screen for use in managing print jobs held in a print queue.

FIG. 3 is a view of an example of the print job management screen for use in managing print jobs held in the print queue 203.

The print job management screen 300 is generated by the CPU 114 executing the function of the print job list display section 206, and is displayed on the console section 120. A print job list 310 displays print jobs held in the print queue 203 in a list form. In the example illustrated in FIG. 3, a total of five print jobs are stored in the print queue 203.

In the print job list 310, a print order number 311, a print job name 312, a page count 313, a copy count 314, a printed page count 315, and a to-be-used paper 316 are displayed as information associated with each print job.

The print order number 311 represents a place of an associated print job in an order according to which the print jobs displayed in the print job list 310 are printed. The print job name 312 represents the print job name of an associated one of the print jobs. Each print job name is designated e.g. by the operator before generation of a print job, for identification of the print job. If no name is designated by the operator, a general name, such as "Print job N" or "Copy job N" (N is an uniquely assigned integer), is automatically assigned to the job.

The page count 313 represents the number of print pages per copy of an associated one of the print jobs. The copy count 314 represents the number of print copies of an associated one of the print jobs. The printed page count 315 represents the number of pages already printed and the total number of print pages of an associated one of the print jobs.

The to-be-used paper 316 represents papers (paper type) to be used for printing of an associated one of the print jobs. In the example illustrated in FIG. 3, there are displayed a paper name (e.g. ABC Paper Manufacturing CO. C081), a paper size (e.g. A4), and the number of required papers (e.g. 500).

By referring to the print job list 310, the operator can determine a paper type and the number of papers required for a job to be executed. Further, the operator can touch a desired one of the print jobs displayed in the print job list 310, to thereby select the desired print job. The selected print job is displayed in a highlighted manner (reverse video). In the example illustrated in FIG. 3, Print Job 3 has been selected.

When the number of print jobs held in the print queue 203 is larger than the number of print jobs that can be displayed in the print job list 310 at one time, the operator can operate a scroll bar 317 to thereby display a desired print job.

A cancel button 320 is used to give an instruction for canceling printing of a print job selected from the print job list 310. The print job designated by the printing cancellation instruction issued via the cancel button 320 has printing thereof stopped even during execution of the printing, and is deleted from the print queue 203. At the same time, print settings stored in association with the print job and bitmap data after conversion are also deleted.

An interrupt printing button 321 is used to give an instruction for executing interrupt printing of a print job selected from the print job list 310. The print job designated by the interrupt printing instruction issued via the interrupt printing button 321 has printing thereof preferentially executed by interrupting a print job currently being executed.

A paper assignment configuration button 322 is used to display a configuration screen for assigning papers to the paper feeders of the paper feeder section 140. When the paper assignment configuration button 322 is pressed, a paper assignment configuration screen shown in FIG. 4 is displayed.

Figure 4:
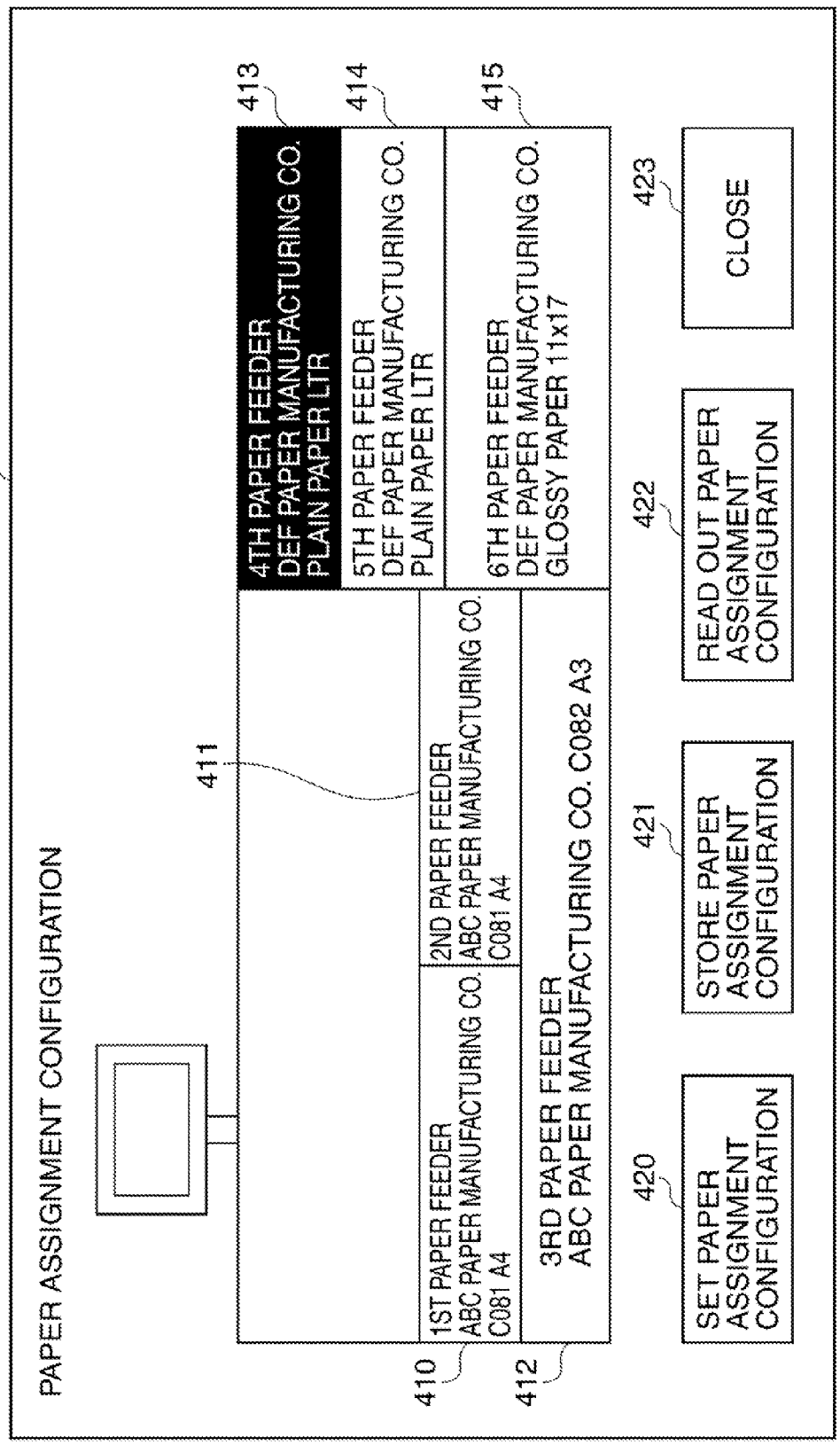
FIG. 4 is a view of an example of a paper assignment configuration screen used by an operator to assign papers to each associated one of a plurality of paper feeders, which contains the papers.

FIG. 4 is a view of an example of a paper assignment configuration screen used by the operator for assigning papers to each associated one of the paper feeders, which contains the papers.

The paper assignment configuration screen 400 is generated by the CPU 114 executing the function of the paper assignment configuration section 207 and is displayed on the console section 120.

Each of paper feeder information display sections 410 to 415 displays information for identifying papers assigned to an associated one of the first to sixth paper feeders 141 to 146. The paper feeder information display sections 410 to 415 are displayed according to the physical locations of the respective paper feeders. Further, in each of the paper feeder information display sections 410 to 415 are displayed a paper name and a paper size as information for identifying papers currently assigned thereto.

The operator can touch one of the paper feeder information display sections 410 to 415 displayed on the paper assignment configuration screen 400, to thereby select the associated paper feeder information. The selected paper feeder information is displayed in a highlighted manner (reverse video). In the example illustrated in FIG. 4, the paper feeder information display section 413 corresponding to the fourth paper feeder has been selected.

A paper assignment set button 420 is used by the operator for starting assignment of papers to a paper feeder selected by the above-described operation. When the paper assignment set button 420 is pressed, a paper assignment screen shown in FIG. 5 is displayed.

Figure 6:
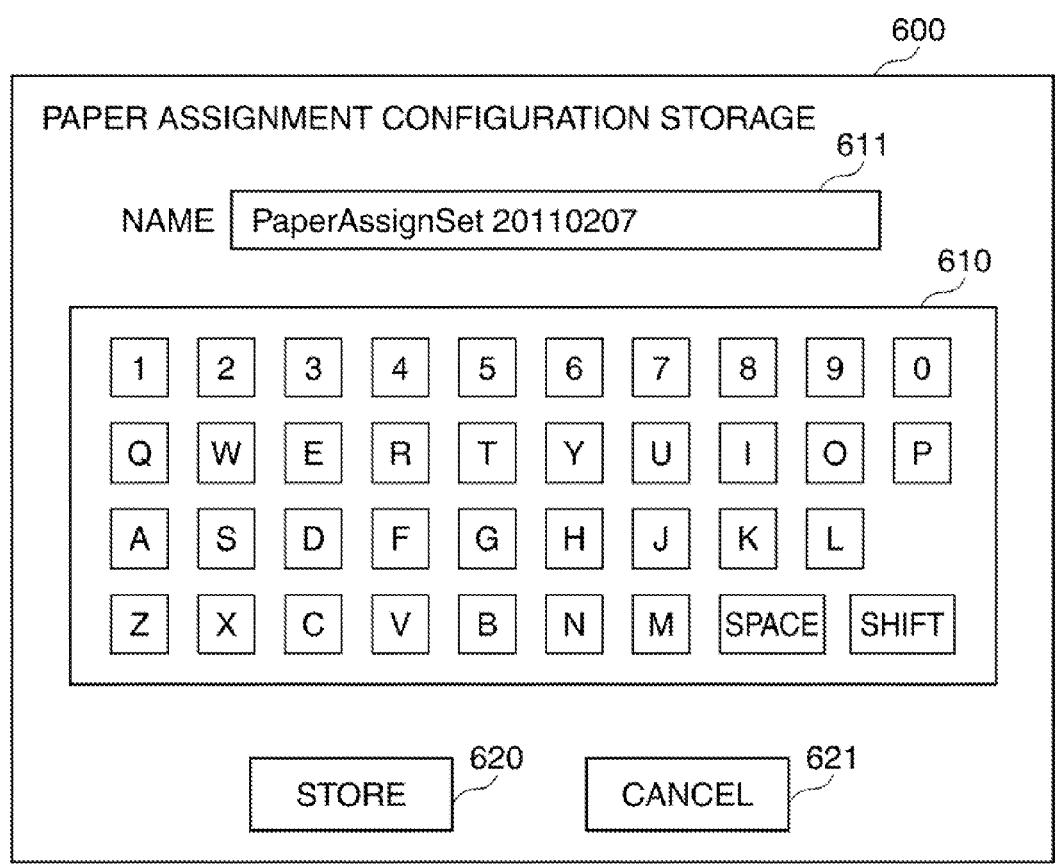
FIG. 6 is a view of an example of a paper assignment configuration storage screen for storing a paper assignment configuration set by the operator.

A paper assignment configuration storage button 421 is used to store the current paper assignment configuration in the HDD 115. When the paper assignment configuration storage button 421 is pressed, a paper assignment configuration storage screen shown in FIG. 6 is displayed.

Figure 9:
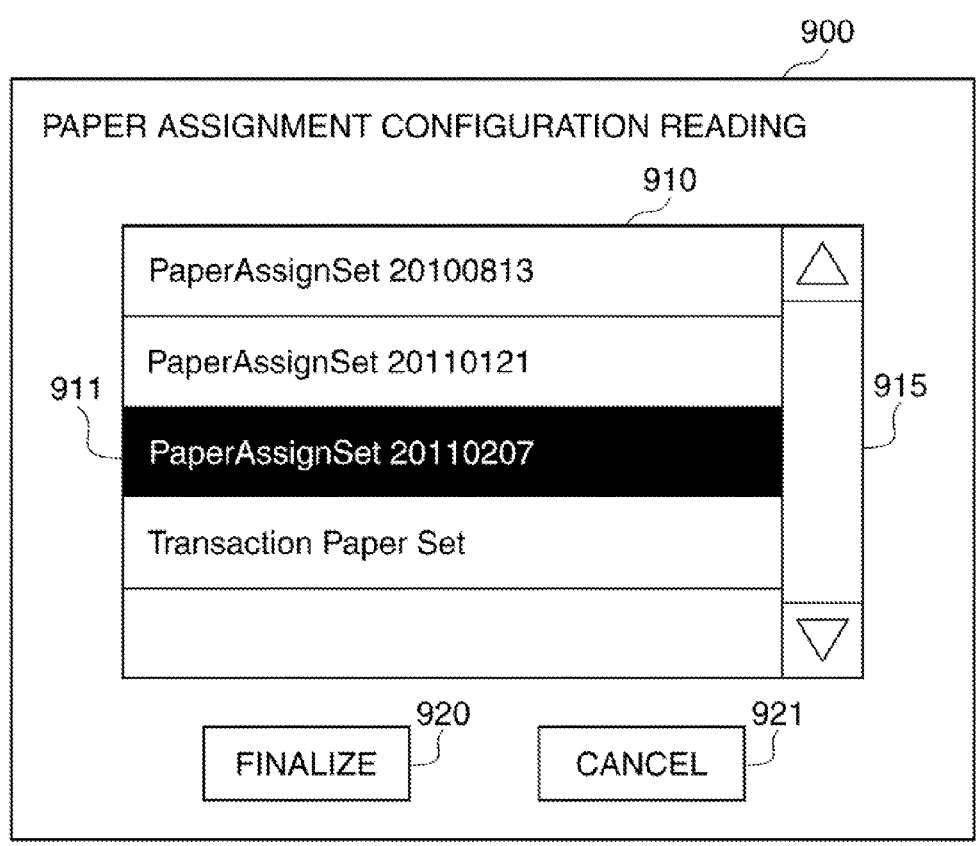
FIG. 9 is a view of an example of a paper assignment configuration-reading screen for reading out and setting a stored paper assignment configuration as the current paper assignment configuration.

A paper assignment configuration read button 422 is used to read out and set a paper assignment configuration stored by the paper assignment configuration storage section 208, as the current paper assignment configuration. When the paper assignment configuration read button 422 is pressed, a paper assignment configuration-reading screen shown in FIG. 9 is displayed. When a close button 423 is pressed, the paper assignment configuration screen 400 is closed and switched back to the print job management screen 300.

Figure 5:
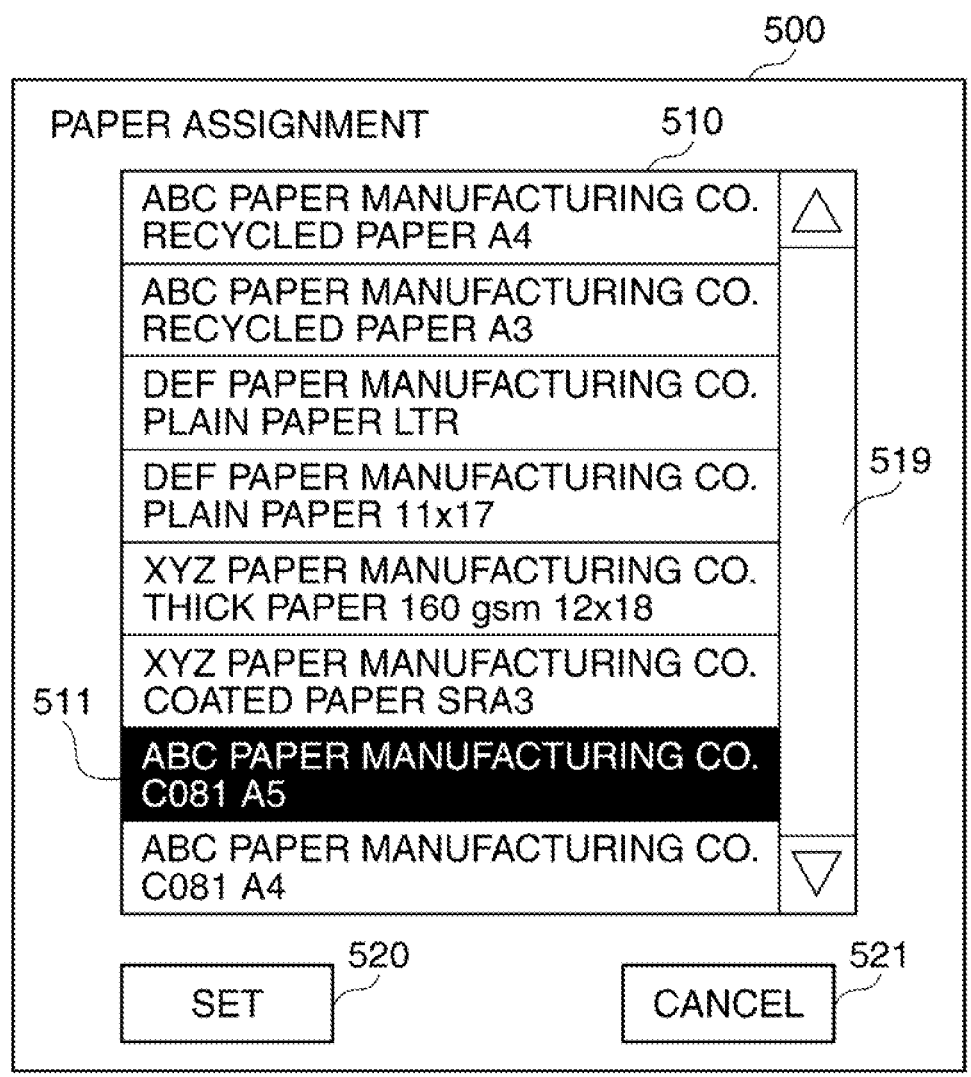
FIG. 5 is a view of an example of a paper assignment screen used by the operator for assigning papers contained in a paper feeder selected by the operator.

FIG. 5 is a view of an example of a paper assignment screen used by the operator for assigning papers to a paper feeder selected by the operator, which contains the papers.

The paper assignment screen 500 is generated by the CPU 114 executing the function of the paper assignment configuration section 207, and is displayed on the console section 120 (first setting).

A paper list 510 displays paper information managed by the media library 205 in a list form. In the example illustrated in FIG. 5, there are displayed eight paper information items. The paper information includes a paper name (e.g. ABC Paper Manufacturing CO. recycled paper) and a paper size (e.g. A4) as paper identification information.

The operator can touch a desired one of the paper information items displayed on the paper assignment screen 500, to thereby select the paper information. The selected paper information item is displayed in a highlighted manner (reverse video). In the example illustrated in FIG. 5, paper information 511 has been selected.

When the number of paper types managed by the media library 205 is larger than the number of paper types that can be displayed in the paper list 510 at the same time, the operator can operate a scroll bar 519 to thereby display a desired paper type.

When a set button 520 is pressed, a paper type currently selected on the paper list 510 is finalized as a type of papers to be assigned to the paper feeder selected in advance. This causes the paper assignment configuration section 207 to update an assignment setting associated with the paper feeder, and the paper assignment screen 500 is closed and switched back to the paper assignment configuration screen 400.

When a cancel button 521 is pressed, assignment of the paper to the paper feeder selected in advance is canceled. In this case, the paper assignment configuration section 207 does not update an assignment setting associated with the paper feeder, and the paper assignment screen 500 is closed and switched back to the paper assignment configuration screen 400.

FIG. 6 is a view of an example of the paper assignment configuration storage screen for storing a paper assignment configuration set by the operator.

The paper assignment configuration storage screen 600 is generated by the CPU 114 executing the function of the paper assignment configuration storage section 208, and is displayed on the console section 120.

A software keyboard 610 enables the operator to input a desired character string by touching keys displayed thereon. A paper assignment configuration name display section 611 displays the character string input by the operator using the software keyboard 610. The character string displayed in the paper assignment configuration name display section 611 is stored in the HDD 115, together with a paper assignment configuration, as a name given thereto. Note that a job selected by the operator may be stored along with the paper assignment configuration name and the paper assignment configuration. The operator can read out the paper assignment configuration stored in the HDD 115, by designating or selecting the paper assignment configuration name.

When a store button 620 is pressed, a character string displayed in the paper assignment configuration name display section 611 is finalized as the name of a paper assignment configuration to be stored. The paper assignment configuration storage section 208 stores the current paper assignment configuration in the HDD 115 together with its paper assignment configuration name, and the paper assignment configuration storage screen 600 is closed and switched back to the paper assignment configuration screen 400.

When a cancel button 621 is pressed, processing for storing the current paper assignment configuration is canceled. In this case, the paper assignment configuration storage section 208 does not store the current paper assignment configuration, but the paper assignment configuration storage screen 600 is closed and switched back to the paper assignment configuration screen 400.

Figure 7:
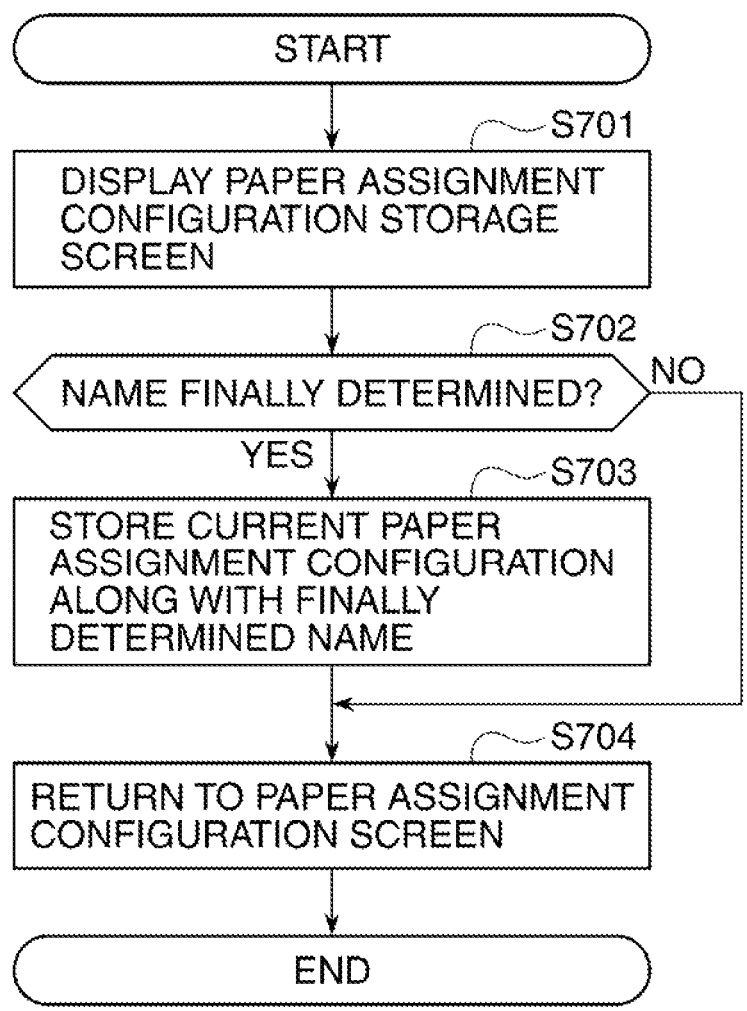
FIG. 7 is a flowchart of a paper assignment configuration storage process executed by the printing apparatus.

FIG. 7 is a flowchart of a paper assignment configuration storage process executed by the printing apparatus 110. The present process is executed by the CPU 114 using the function of the paper assignment configuration storage section 208.

When the paper assignment configuration storage button 421 on the paper assignment configuration screen 400 is pressed, the paper assignment configuration screen 400 is switched to the paper assignment configuration storage screen 600 (step S701).

Then, the CPU 114 determines whether or not the name of a paper assignment configuration has been finalized by the operator (step S702). If the name has been finalized, i.e. if the store button 620 has been pressed on the paper assignment configuration storage screen 600 (YES to the step S702), the CPU 114 proceeds to a step S703. On the other hand, if it is determined in the step S702 that the name has not been determined, i.e. if the cancel button 621 has been pressed (NO to the step S702), the CPU 114 proceeds to a step S704.

In the step S703, the CPU 114 stores the current paper assignment configuration in the HDD 115 together with its paper assignment configuration name (step S703). The current paper assignment configuration, its paper assignment configuration name, and a job selected by the operator on the print job management screen 300 may be stored in the HDD 115 in association with each other.

Then, the CPU 114 closes the paper assignment configuration storage screen 600 and switches the screen back to the paper assignment configuration screen 400 (step S704), followed by terminating the present process.

FIG. 8 is a schematic diagram of an example of a paper assignment configuration stored in the HDD 115 in the step S703 of FIG. 7. Although in the present embodiment, a description is given using the schematic diagram, the paper assign configuration is stored as digital information e.g. in the XML format in actuality.

A paper assignment configuration name 801 is the paper assignment configuration name determined in the step S702. Paper assignment configurations 810 to 815 each represent settings of a paper assignment configuration associated with each of the first to sixth paper feeders. In the example illustrated in FIG. 8, paper names and paper sizes are stored as information for identifying papers (paper types) assigned to the respective paper feeders. Note that the information for identifying papers (paper type) assigned to a paper feeder is not limited to a paper name and a paper size, but e.g. a paper ID managed in the media library 205 may be used.

FIG. 9 is a view of an example of a paper assignment configuration-reading screen for reading out and setting a paper assignment configuration stored in the HDD 115 by the paper assignment configuration storage section 208, as the current paper assignment configuration.

The paper assignment configuration-reading screen 900 is generated by the CPU 114 executing the function of the paper assignment configuration-reading section 209, and is displayed on the console section 120.

A paper assignment configuration name list 910 displays paper assignment configuration names stored in advance by the paper assignment configuration storage section 208 in a list form. In the example illustrated in FIG. 9, there are displayed four paper assignment configuration names. The operator can touch a desired one of the paper assignment configuration names displayed in the paper assignment configuration name list 910, to thereby select the desired paper assignment configuration name. Thus, the user can select a desired paper assignment configuration from the paper assignment configurations stored in the HDD 115. The selected paper assignment configuration name is displayed in a highlighted manner (reverse video). In the example illustrated in FIG. 9, a paper assignment configuration name 911 has been selected.

When the number of paper assignment configuration names stored by the paper assignment configuration storage section 208 is larger than the number of paper assignment configuration names that can be displayed in the paper assignment configuration name list 910 at one time, the operator can operate a scroll bar 915 to thereby display a desired paper assignment configuration name.

When a finalization button 920 is pressed, a paper assignment configuration associated with a paper assignment configuration name selected on the paper assignment configuration name list 910 is finalized as the current paper assignment configuration, and the paper assignment configuration-reading screen 900 is closed and switched back to the paper assignment configuration screen 400.

When a cancel button 921 is pressed, reading of a paper assignment configuration is canceled, and the paper assignment configuration-reading screen 900 is closed and switched back to the paper assignment configuration screen 400.

Figure 10:
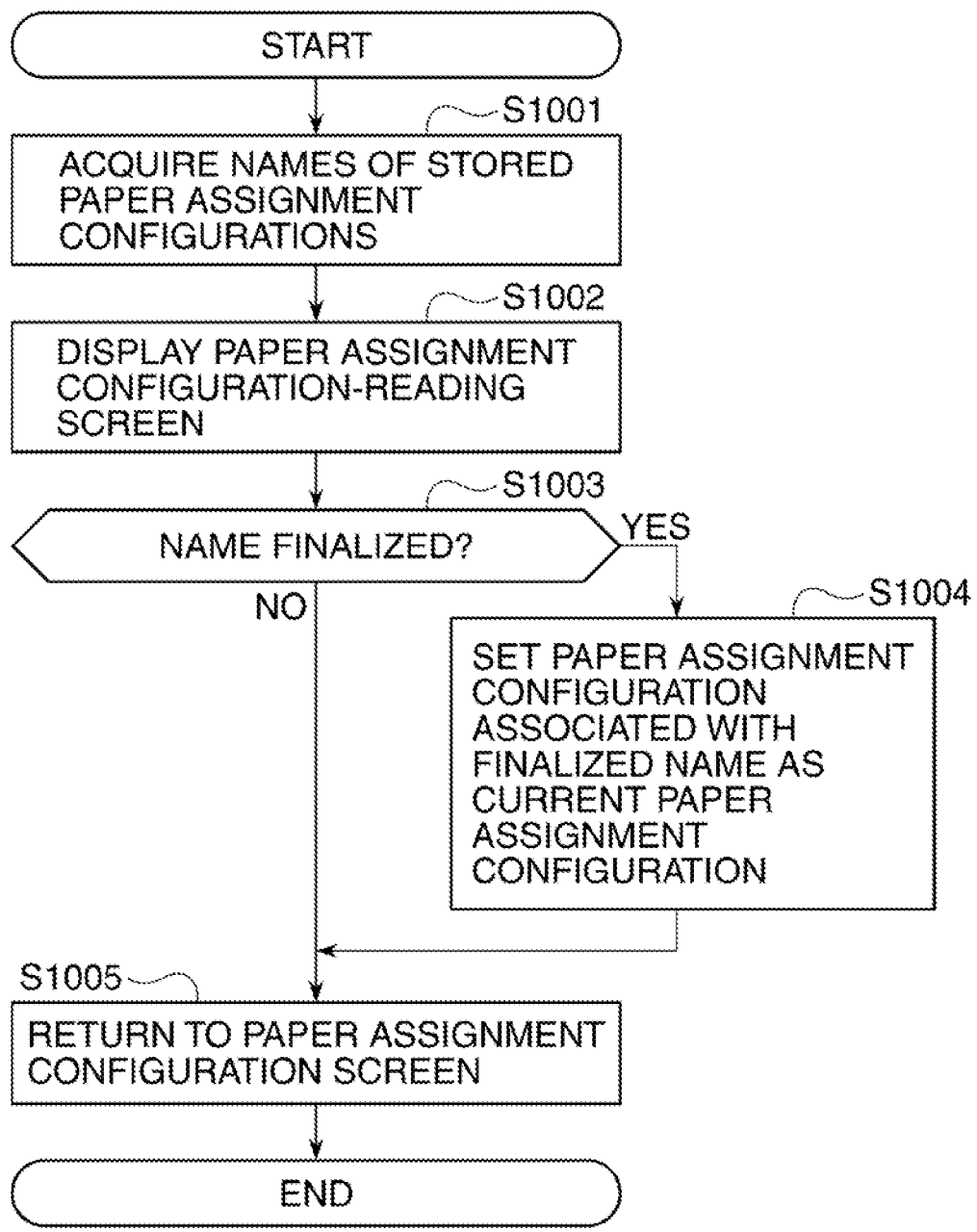
FIG. 10 is a flowchart of a paper assignment reading and setting process executed by the printing apparatus.

FIG. 10 is a flowchart of a paper assignment reading and setting process executed by the printing apparatus 110. The present process is executed by the CPU 114 using the function of the paper assignment configuration-reading section 209.

When the paper assignment configuration read button 422 on the paper assignment configuration screen 400 is pressed, the CPU 114 acquires paper assignment configuration names stored in the HDD 115 (step S1001). Then, the paper assignment configuration screen 400 is switched to the paper assignment configuration-reading screen 900 (step S1002).

Next, the CPU 114 determines whether or not a paper assignment configuration name has been finalized by the operator (step S1003). If the name has been finalized, i.e. if the finalization button 920 was pressed on the paper assignment configuration-reading screen 900 (YES to the step S1003), the CPU 114 proceeds to a step S1004. On the other hand, if it is determined in the step S1003 that the name has not been finalized i.e. if the cancel button 921 was pressed (NO to the step S1003), the CPU 114 proceeds to a step S1005.

In the step S1004, the CPU 114 sets a paper assignment configuration associated with the finalized paper assignment configuration name as the current paper assignment configuration. Then, the CPU 114 closes the paper assignment configuration-reading screen 900 and switches the screen back to the paper assignment configuration screen 400 (step S1005), followed by terminating the present process.

According to the above-described first embodiment, a set paper assignment configuration is stored in response to an instruction from the operator. Further, the stored paper assignment configuration is read out in response to an instruction from the operator, and the read paper assignment configuration is set as the current paper assignment configuration. This enables the operator to read out a stored paper assignment configuration in desired timing, which makes it possible to reduce time and labor required for the operator to configure paper assignment, thereby contributing to improvement of user-friendliness of the apparatus.

Next, a second embodiment will be described. In the first embodiment, a paper assignment configuration set by an operator is stored, and the stored paper assignment configuration is read out and set as the current paper assignment configuration in response to an operation by the operator. By the way, in the case of reading out a stored paper assignment configuration, a paper feeder being assigned, in the newly read paper assignment configuration, different papers (paper type) from those assigned in the preceding paper assignment configuration, needs replacement of papers contained therein. In the second embodiment, upon reading out a paper assignment configuration, an operator is notified of a paper feeder which needs paper replacement. A printing system including a printing apparatus according to the second embodiment is identical in hardware configuration and software configuration to the printing system described with reference to FIGS. 1 and 2 in the first embodiment. Therefore, the same components and elements as those of the first embodiment are denoted by the same reference numerals, and description thereof is omitted. In the following, only different points from the first embodiment will be described.

A description will be given, with reference to FIGS. 11A to 11C, of the method of notifying an operator of a paper feeder which needs paper replacement, when a paper assignment configuration is set by the paper assignment configuration-reading section 209.

FIG. 11A is a diagram of an example of the current paper assignment configuration, and FIG. 11B is a diagram of an example of a read paper assignment configuration.

A comparison between FIGS. 11A and 11B shows that there are differences in paper assignment in the third paper feeder and the fifth paper feeder. In this case, after a paper assignment configuration is read out, the operator needs to replace papers contained in the third paper feeder and papers contained in the fifth paper feeder.

Figure 11C:
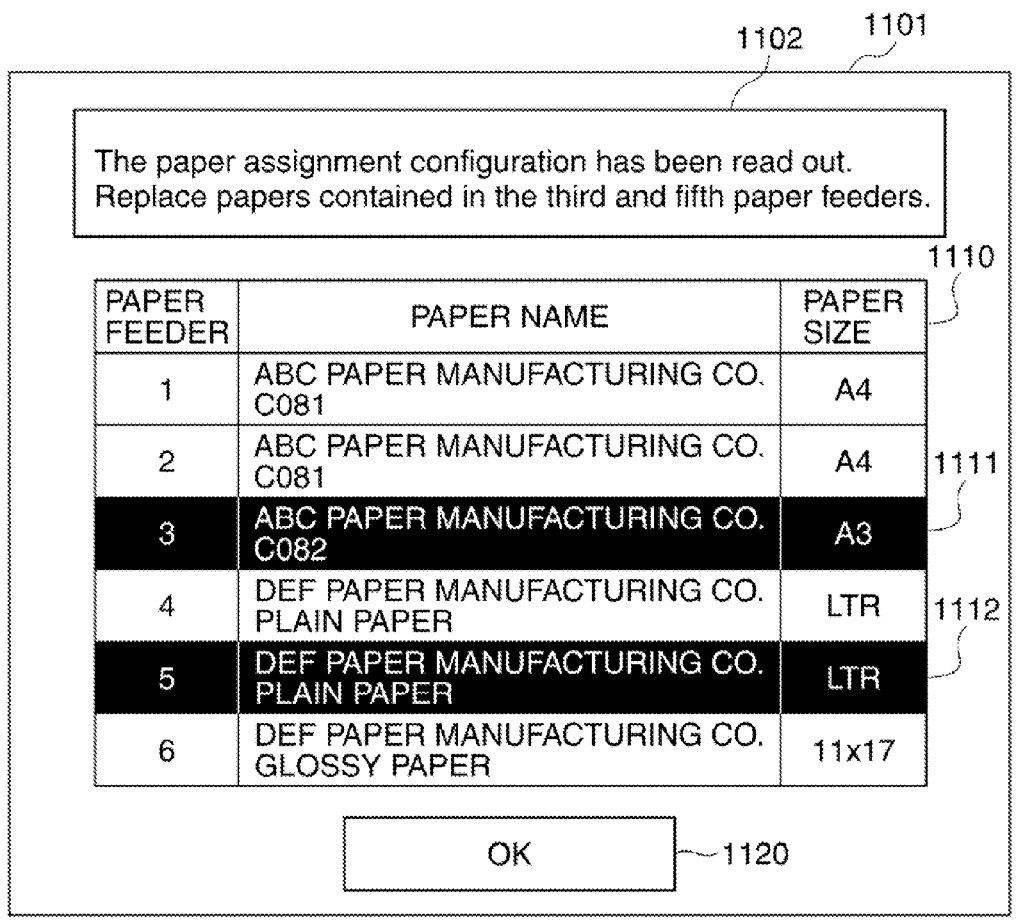
FIG. 11C is a view of an example of a notification screen for notifying the operator of a paper feeder that needs paper replacement, when the paper assignment configuration is read out.

FIG. 11C is a view of an example of a notification screen for notifying the operator of a paper feeder that needs paper replacement, when a paper assignment configuration is read out.

Reference numeral 1101 denotes the notification screen in its entirety which is displayed on the console section 120. Reference numeral 1102 denotes a message box for notifying the operator of a paper feeder which needs paper replacement. The message box 1102 displays a message prompting the operator to replace papers contained in the third paper feeder and papers contained in the fifth paper feeder.

A paper assignment configuration display section 1110 displays a read paper assignment configuration, with a paper feeder which needs paper replacement highlighted (in reverse video). In the example illustrated in FIG. 11C, a paper assignment configuration displayed in the paper assignment configuration display section 1110 corresponds to that shown in FIG. 11B, and the third paper feeder 1111 and the fifth paper feeder 1112 are displayed in a highlighted manner.

The operator can refer to the notification screen 1101 to thereby recognize a paper feeder which needs paper replacement and the paper type of papers to be used for the paper replacement. When an OK button 1120 is pressed after completion of paper replacement in a paper feeder, the CPU 114 closes the notification screen 1101.

Figure 12:
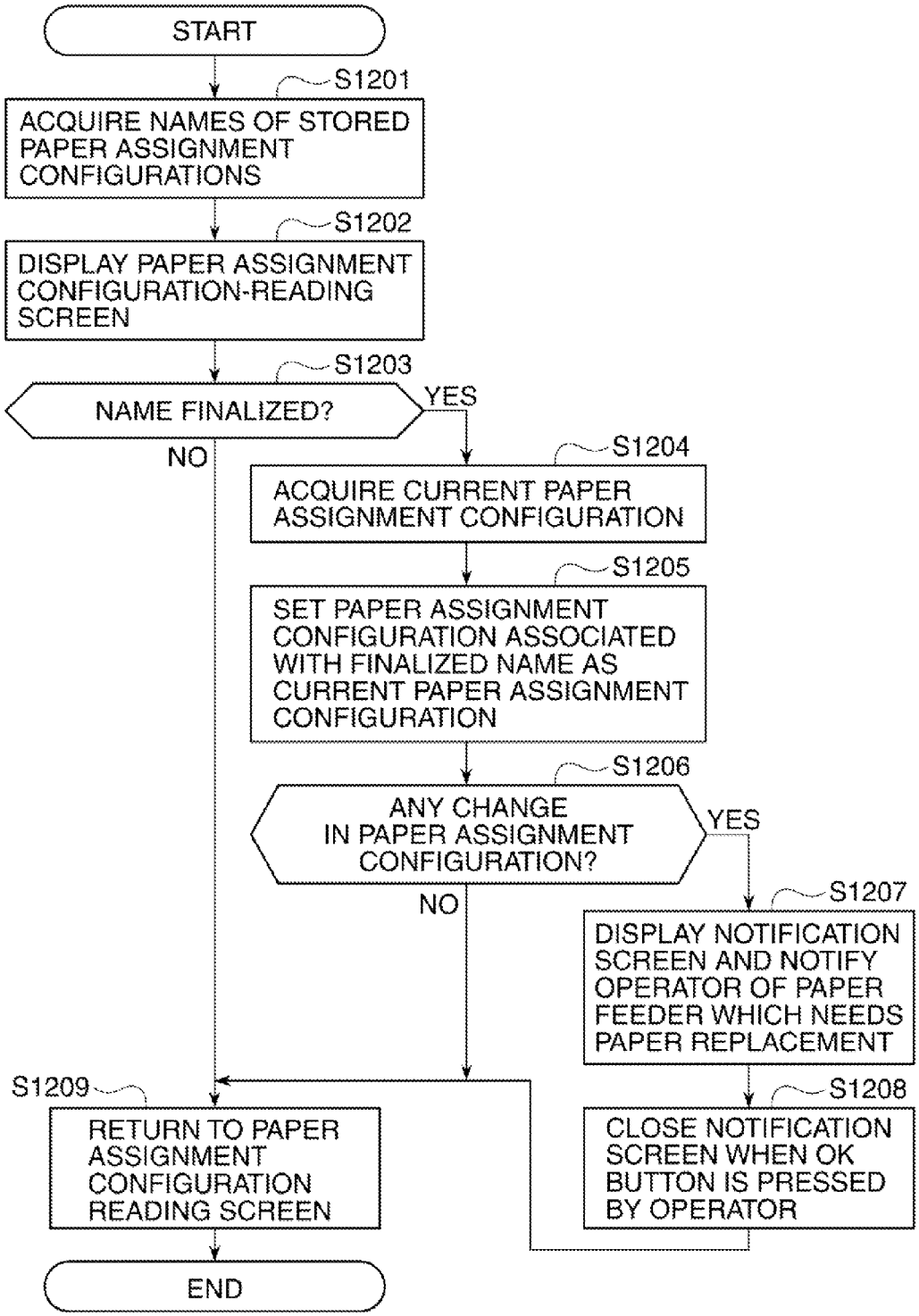
FIG. 12 is a flowchart of a process for determining whether or not there is any setting to be changed, which is executed when the paper assignment configuration is read out.

FIG. 12 is a flowchart of a process for determining whether or not there is any setting to be changed, which is executed when a paper assignment configuration is read out. The present process is executed by the CPU 114 using the function of the paper assignment configuration-reading section 209.

Steps S1201 to S1203 and S1209 of FIG. 12 are identical to the steps S1001 to S1003 and S1005 of FIG. 10, and therefore description thereof is omitted.

If it is determined in the step S1203 that the name has been finalized, i.e. if the finalization button 920 was pressed on the paper assignment configuration-reading screen 900 (YES to the step S1203), the CPU 114 proceeds to a step S1204. On the other hand, if the name has not been finalized, i.e. if the cancel button 921 was pressed (NO to the step S1203), the CPU 114 proceeds to the step S1209.

In the step S1204, the CPU 114 acquires the current paper assignment configuration having been used in the printing apparatus 110. Then, the CPU 114 reads out and sets a paper assignment configuration associated with the finalized paper assignment configuration name as the current paper assignment configuration (step S1205).

Next, the CPU 114 compares between the paper assignment configuration acquired in the step S1204 and the paper assignment configuration read out in the step S1205, and determines whether or not there is any change in paper assignment configuration (step S1206). If it is determined in the step S1206 that there is any change (YES to the step S1206), the CPU 114 displays the notification screen 1101 on the console section 120 to thereby notify the operator of a paper feeder which needs paper replacement (step S1207). Thereafter, when the OK button 1120 is pressed by the operator, the CPU 114 closes the notification screen 1101 (step S1208), and then proceeds to the step S1209. On the other hand, if it is determined in the step S1206 that there is no change (NO to the step S1206), the CPU 114 immediately proceeds to the step S1209.

According to the above-described second embodiment, when a paper assignment configuration is read out, the read paper assignment configuration is compared with the current paper assignment configuration, and when a paper feeder needs paper replacement, the operator is notified of the fact. This makes it possible to reduce time and labor required for the operator to determine a paper feeder which needs paper replacement, to thereby contribute to improvement of user-friendliness of the apparatus.

Next, a description will be given of a third embodiment of the present invention. In the case of re-executing a completed print job, an operator configures paper assignment according to the print job to be re-executed. In this case, it is desired to use a paper assignment configuration set in the previous execution of the print job. In the third embodiment, when an instruction for re-executing a completed print job is issued, a paper assignment configuration set in the previous execution of the print job is automatically read out and set for reprinting. The hardware configuration of a printing system including a printing apparatus according to the third embodiment is identical to that of the printing system described with reference to FIG. 1. Therefore, the same components and elements as those of the first embodiment are denoted by the same reference numerals, and description thereof is omitted. In the following, only different points from the above-described embodiments will be described.

Figure 13:
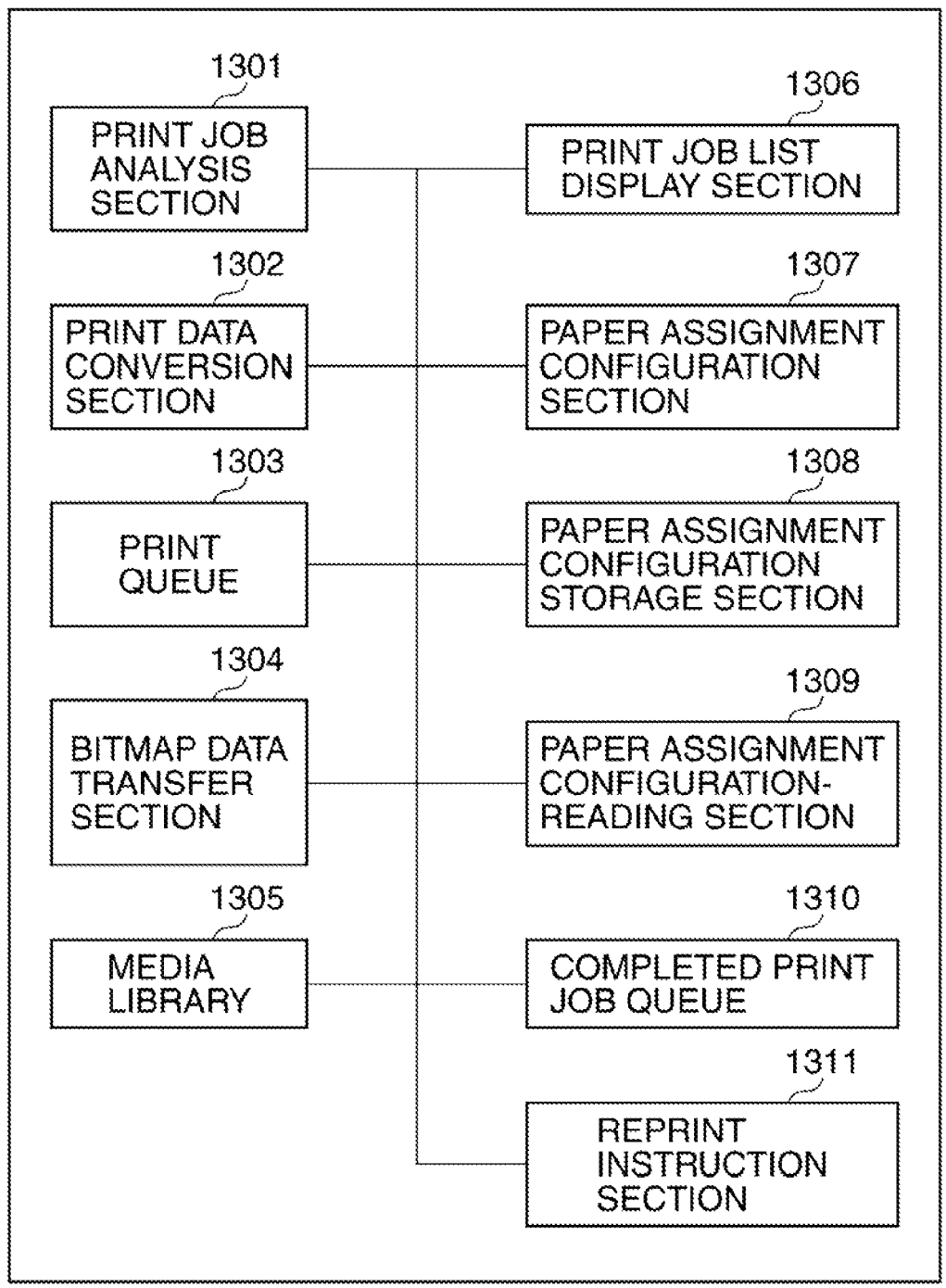
FIG. 13 is a block diagram of the software configuration of a printing apparatus according to a third embodiment of the present invention.

FIG. 13 is a block diagram of the software configuration of the printing apparatus 110 according to the third embodiment. Software modules appearing in FIG. 13 are stored in the ROM 112 or the HDD 115 within the controller box 200. The software modules are each read into the RAM 113, as required, and executed by the CPU 114. The modules 1301 to 1309 in FIG. 13 are the same as the modules 201 to 209 in FIG. 2, and therefore description thereof is omitted.

A completed print job queue 1310 is a module configured to manage print jobs having printing thereof already completed. When printing of a print job is completed, bitmap data obtained through conversion by the print data conversion section 1302, print settings analyzed by the print job analysis section 1301, and a paper assignment configuration set at the start of the printing of the print job are sent to the completed print job queue 1310. In the completed print job queue 1310, these information items are managed in association with each other.

A reprint instruction section 1311 is a module configured to receive from the operator a reprint request for reprinting of a print job managed by the completed print job queue 1310. The print job designated for reprinting is read out from the completed print job queue 1310, and reprinting is started.

Next, a description will be given of a process executed by the printing system in a case where the operator reprints a completed print job.

Figure 14:
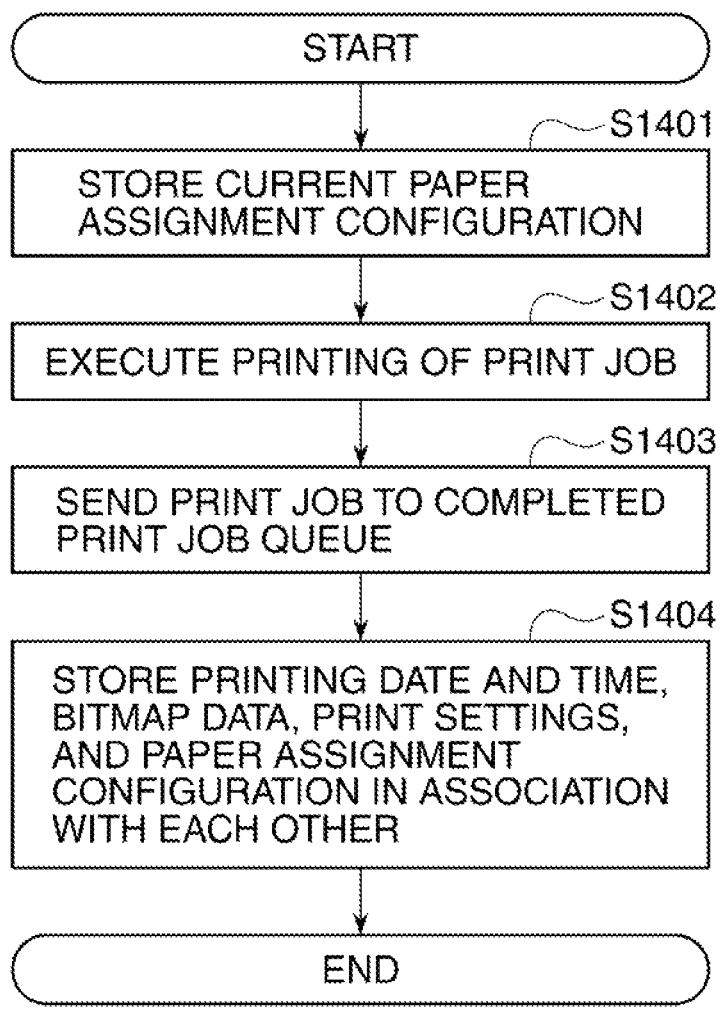
FIG. 14 is a flowchart of a print job printing process executed by the printing apparatus according to the third embodiment.

FIG. 14 is a flowchart of a print job printing process executed by the CPU 114 of the printing apparatus 110 according to the third embodiment.

When a print job is sent to the print queue 1303, the CPU 114 causes the paper assignment configuration storage section 1308 to store the current paper assignment configuration in the HDD 115 (step S1401). In the first embodiment, the operator designates the paper assignment configuration name of a paper assignment configuration to be stored. In the present embodiment, however, a paper assignment configuration is automatically stored, and hence the CPU 114 sets and stores information e.g. on a print job name and a printing time, such as "Copy Job 1 Paper Assign Set" and "Paper Assign Set 2011/02/07 13:31", as a paper assignment configuration name.

Then, the CPU 114 sends bitmap data formed through conversion by the print data conversion section 1302 to the printer engine 150, and the printer engine 150 performs printing (step S1402). When the printing is completed, the CPU 114 sends the print job to the completed print job queue 1310 (step S1403). In the completed print job queue 1310, the print job is stored in the HDD 115, in association with the paper assignment configuration stored in the step S1401, together with the printing date and time, the bitmap data, the print settings (step S1404), followed by terminating the present process.

FIG. 15 is a diagram illustrating, by way of example, how print jobs are stored in the completed print job queue 1310.

A print job name 1501 stores the name of a print job. A printing date and time 1502 stores a date and time when printing of the print job was executed. A print setting file 1503 stores the storage position (file path) of print settings read out by the print job analysis section 1301 and stored in the HDD 115 for execution of the printing of the print job. Bitmap data 1504 stores the storage position (file path) of bitmap data formed through conversion by the print data conversion section 1302 and stored in the HDD 115 for execution of the printing of the print job. A paper assignment configuration 1505 stores the storage position (file path) of a paper assignment configuration stored in the HDD 115 by the paper assignment configuration storage section 208 in the step S1401 of FIG. 14 for execution of the printing of the print job.

FIG. 16 is a view of an example of a completed print job queue screen used by the operator for executing reprinting of a print job held in the completed print job queue 1310. The screen shown in FIG. 16 is a history screen for the user to check completed print jobs.

The completed print job queue screen 1600 is generated by the CPU 114 executing the function of the reprint instruction section 1311 and is displayed on the console section 120. A completed print job list 1610 displays print jobs held in the completed print job queue 1310. In the example illustrated in FIG. 16, a total of five print jobs are stored in the completed print job queue 1310.

The completed print job list 1610 displays a print job name 1611, a printing date and time 1612, a page count 1613, a copy count 1614, and a to-be-used paper 1615, as information associated with each print job.

The print job name 1611 indicates the print job name of each print job. The printing date and time 1612 indicates a printing date and time when printing of each print job was executed. The page count 1613 indicates the number of printed pages per copy in each print job. The copy count 1614 indicates the number of copies of each print job. The to-be-used paper 1615 represents papers used in each print job. In the example illustrated in FIG. 16, a paper name (e.g. ABC Paper Manufacturing CO. C081), a paper size (e.g. A4), and the number of required papers (e.g. 500) are displayed to represent the to-be-used paper 1615.

The operator can touch a portion of the completed print job list 1610, where a desired print job is displayed, on the console section 120 to thereby select the print job. The selected print job is displayed in a highlighted manner (reverse video). In the example illustrated in FIG. 16, Print Job 1 has been selected.

When the number of print jobs stored in the completed print job queue 1310 is larger than the number of print jobs that can be displayed in the completed print job list 1610 at one time, the operator can operate a scroll bar 1616 to thereby display a desired print job.

A reprint button 1620 is used to give an instruction for starting reprinting of a print job selected in the completed print job list 1610. When a print queue button 1621 is pressed, the completed print job queue screen 1600 is switched to the print job management screen shown in FIG. 3.

Next, a description will be given, with reference to FIG. 17, of an operation performed by the printing apparatus 110 when a print job to be re-executed is designated on the completed print job queue screen 1600 and reprinting of the print job is executed.

Figure 17:
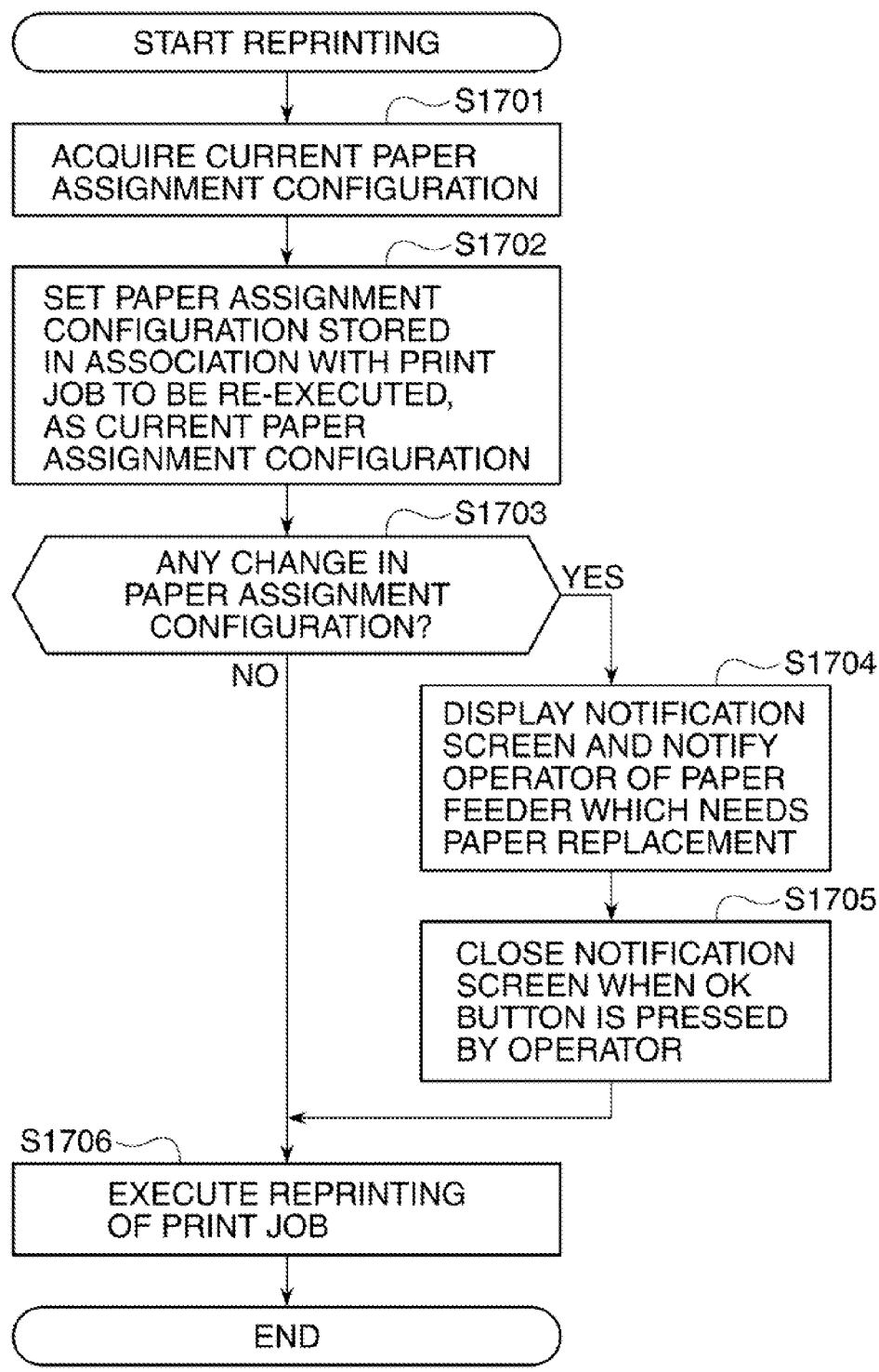
FIG. 17 is a flowchart of a print job reprinting process executed by the printing apparatus.

FIG. 17 is a flowchart of a print job reprinting process executed by the CPU 114 of the printing apparatus 110.

When reprinting is started, the CPU 114 acquires the current paper assignment configuration set in the printing apparatus 110 (step S1701). Then, the CPU 114 reads out from the HDD 115 a paper assignment configuration stored in the completed print job queue 1310 in association with the print job to be re-executed, and sets the read-out paper assignment configuration as the current paper assignment configuration (step S1702).

Next, the CPU 114 compares between the paper assignment configuration acquired in the step S1701 and the paper assignment configuration read out in the step S1702 to thereby determine whether or not there is any change in paper assignment configuration (step S1703). If it is determined in the step S1703 that there is any change (YES to the step S1703), the CPU 114 displays the notification screen 1101 on the console section 120 and notifies the operator of a paper feeder which needs paper replacement (step S1704). Thereafter, when the OK button 1120 is pressed by the operator, the notification screen 1101 is closed (step S1705), and then the process proceeds to a step S1706. On the other hand, if it is determined in the step S1703 that there is no change (NO to the step S1703), the CPU 114 immediately proceeds to the step S1706.

In the step S1706, reprinting of the print job is performed based on the paper assignment configuration set in the step S1702 (step S1706), followed by terminating the present process.

According to the above-described third embodiment, when reprinting of a print job having once been processed is to be executed, a previously set paper assignment configuration is automatically read out for the reprinting. This makes it possible to reduce time and labor required for the operator to configure paper assignment, thereby contributing to improvement of user-friendliness of the apparatus.

In the third embodiment, when re-execution (reprinting) of a print job is to be performed, a paper assignment configuration associated with the print job is read out and automatically set. However, when a paper assignment configuration associated with a completed print job is automatically read out and set, it is not necessarily required to re-execute the completed print job. In view of this, a set button different from the reprint button 1620 may be provided on the completed print job queue screen 1600, and when the set button is pressed by the user, the paper assignment configuration associated with the print job may be automatically read out and set without re-execution of the print job.

Next, a fourth embodiment of the present invention will be described. In the above-described third embodiment, when printing of a print job is to be executed, a paper assignment configuration set in the printing apparatus at the start of the printing is stored in association with the print job. In this case, it is assumed that before issuing the instruction for starting printing of the print job, the operator places required papers in a paper feeder and completes appropriate paper assignment.

However, when the operator has not placed required papers in the paper feeder before the start of printing, papers run out during execution of the printing. Therefore, at this time, the operator has to place required papers in the paper feeder. To solve this problem, in the fourth embodiment, when a change in paper assignment occurs during execution of a print job, a changed paper assignment configuration is stored in association with the print job. A printing system including the printing apparatus according to the fourth embodiment is identical in hardware configuration to the printing system described with reference to FIG. 1 and identical in software configuration to the printing system described with reference to FIG. 13. Therefore, the same components and elements are denoted by the same reference numerals, and description thereof is omitted. In the following, only different points from the above-described embodiments will be described.

Figure 18:
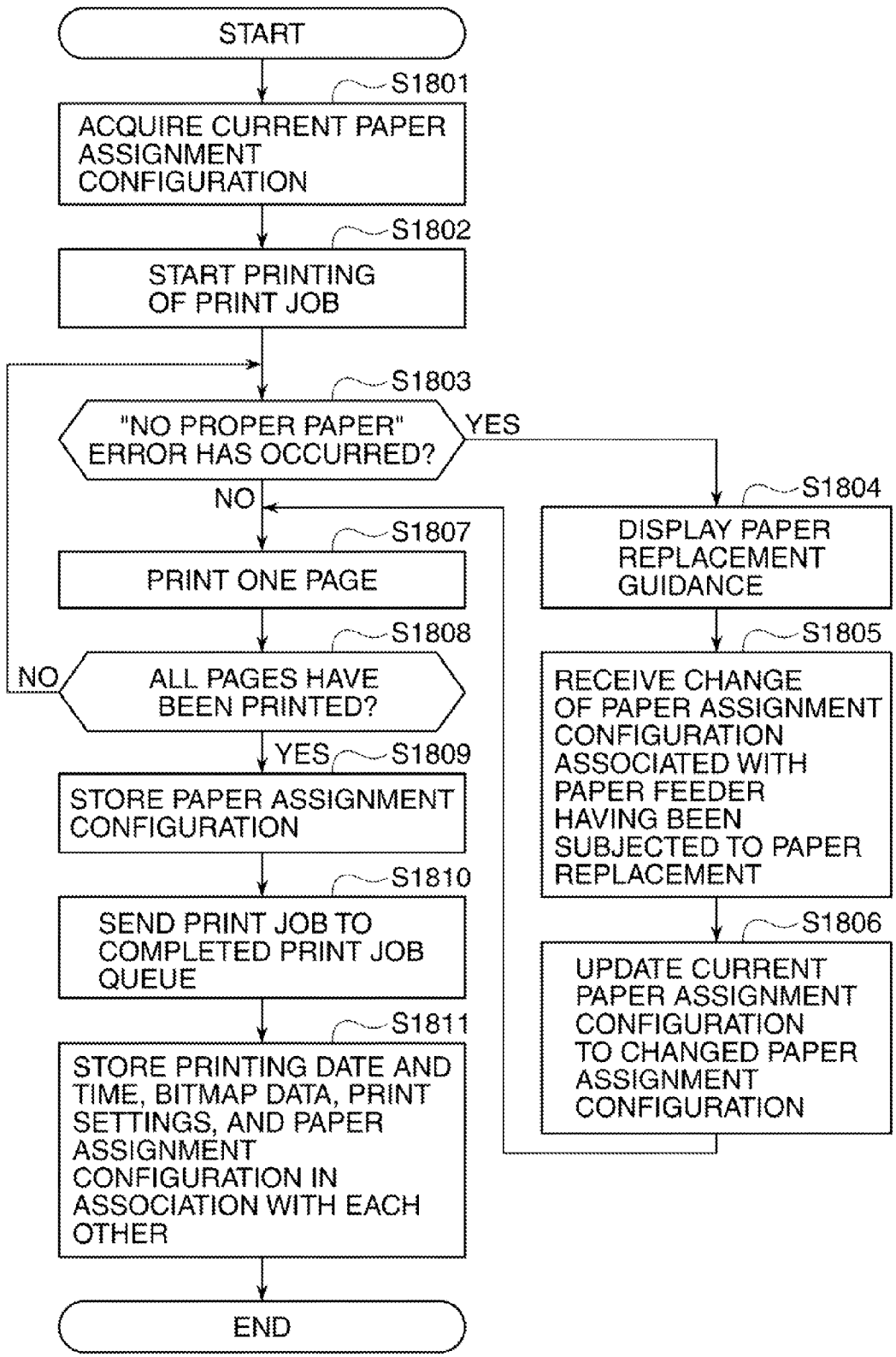
FIG. 18 is a flowchart of a print job printing process executed by a printing apparatus according to a fourth embodiment of the present invention.

FIG. 18 is a flowchart of a print job printing process executed by the CPU 114 of the printing apparatus 110 according to the fourth embodiment.

When a print job is sent to the print queue 1303, the CPU 114 acquires the current paper assignment configuration and stores the same in the RAM 113 (step S1801). Then, the CPU 114 starts printing of the print job (step S1802). Then, the CPU 114 determines whether or not a "no proper paper" error has occurred, before execution of printing of each page (step S1803). The "no proper paper" error refers to a paper error that printing is interrupted because papers required for printing have not been assigned to a paper feeder. The step S1803 corresponds to an example of the function of an error determination unit.

If it is determined in the step S1803 that a "no proper paper" error has not occurred (NO to the step S1803), the CPU 114 proceeds to a step S1807. On the other hand, if a "no proper paper" error has occurred (YES to the step S1803), the CPU 114 displays a guidance prompting the user to perform paper replacement e.g. on the console section 120 (step S1804). When paper replacement is completed, the CPU 114 receives a change of a paper assignment setting associated with a paper feeder having been subjected to paper replacement, in the step S1804 (step S1805). The step S1805 corresponds to an example of the function of a paper assignment configuration change unit.

Then, the CPU 114 updates the current paper assignment configuration acquired in the step S1801 to the paper assignment configuration changed in the step S1805 (step S1806), and then the CPU 114 proceeds to the step S1807. The step S1806 corresponds to an example of the function of a paper assignment configuration update unit.

In the step S1807, the CPU 114 prints one page of the print job, and then determines whether or not printing of all pages has been completed (step S1808). If it is determined in the step S1808 that printing of all the pages has not been completed (NO to the step S1808), the CPU 114 returns to the step S1803. On the other hand, if it is determined in the step S1808 that printing of all the pages has been completed (YES to the step S1808), the CPU 114 proceeds to a step S1809.

In the step S1809, the CPU 114 reads out the paper assignment configuration from the RAM 113 and causes the paper assignment configuration storage section 1308 to store the same in the HDD 115. In this step, as in the third embodiment, the CPU 114 sets and stores information on the print job name, the printing date and time, etc., such as "Copy Job 1 Paper Assign Set" and "Paper Assign Set 2011/02/07 13:31", as the paper assignment configuration name.

Then, in a step S1810, the CPU 114 sends the print job to the completed print job queue 1310. In the completed print job queue 1310, the print job is stored in the HDD 115 in association with the paper assignment configuration stored in the step S1809, together with the printing date and time, bitmap data, and print settings (step S1811), followed by terminating the present process.

According to the fourth embodiment, it is determined during execution of a print job whether or not a "no proper paper" error has occurred. Then, when it is determined that a "no proper paper" error has occurred, paper replacement is performed for a paper feeder where the paper error has occurred, whereafter a change in paper assignment configuration is accepted and a changed paper assignment configuration is stored (updated). As a consequence, even when an operator did not properly set a paper assignment configuration before the start of printing of the print job, a proper paper assignment configuration is stored in association with the print job. This makes it possible to improve user-friendliness for the operator.

Next, a fifth embodiment of the present invention will be described. In the above-described third and fourth embodiments, in the case of re-executing a print job having once been processed, a previously set paper assignment configuration is automatically read out for reprinting.

However, an operator may not desire automatic reading of a paper assignment configuration. Further, in the third and fourth embodiments, settings of the paper assignment configuration which are associated with all the paper feeders are read out, and the read-out settings include ones associated with paper feeders to which papers unnecessary for the to-be-re-executed print job are assigned. In the fifth embodiment, in the case of re-executing a print job having once been processed, the operator sets a condition for reading out a previously set paper assignment configuration. Further, in the case of reading out a stored paper assignment configuration, only paper assignment settings associated with respective paper feeders to which papers to be used for the to-be-re-executed print job are assigned are read out.

A printing system including a printing apparatus according to the fifth embodiment is identical in hardware configuration to the printing system described with reference to FIG. 1 and identical in software configuration to the printing system according to the fourth embodiment described with reference to FIG. 13. Therefore, the same components and elements are denoted by the same reference numerals, and description thereof is omitted. In the following, only different points from the above-described embodiments will be described.

FIG. 19 is a view of an example of a reprinting print job screen displayed in the fifth embodiment, on which an operator designates whether or not to read out paper assignment settings associated with a print job to be re-executed.

The reprinting print job screen 1900 is generated by the CPU 114, which corresponds to a read-out condition setting unit, executing the function of the reprint instruction section 1311 and is displayed on the console section 120. A reprint job information display section 1910 displays information on a print job to be re-executed. In the example illustrated in FIG. 19, the reprint job information display section 1910 displays a print job name, a printing date and time, a page count, a copy count, and a to-be-used paper.

A paper assignment configuration 1911 represents a paper assignment configuration stored in association with a print job to be subjected to reprinting. In the paper assignment configuration 1911, paper feeders to each of which papers necessary for the print job to be re-executed are assigned are displayed in a highlighted manner (reverse video). In the example illustrated in FIG. 19, the third paper feeder, the fourth paper feeder, and the sixth paper feeder are displayed in a highlighted manner.

The operator can select one of check boxes 1912 to 1914. In the example illustrated in FIG. 19, the check box 1913 has been selected. When the check box 1912 is selected, the CPU 114 does not read out any paper assignment setting. When the check box 1913 is selected, the CPU 114 reads out only paper assignment settings associated with the paper feeders to which papers for use in the print job to be re-executed are assigned. When the check box 1914 is selected, the CPU 114 reads out paper assignment settings associated with all the paper feeders. When an OK button 1920 is pressed after selection of the check boxes 1912 to 1914 by the operator, the CPU 114 closes the reprinting print job screen 1900 and starts reprinting.

Next, a description will be given of an operation process executed by the printing apparatus 110 when the operator designates a print job to be re-executed on the completed print job queue screen 1600 and reprinting is carried out.

Figure 20A:
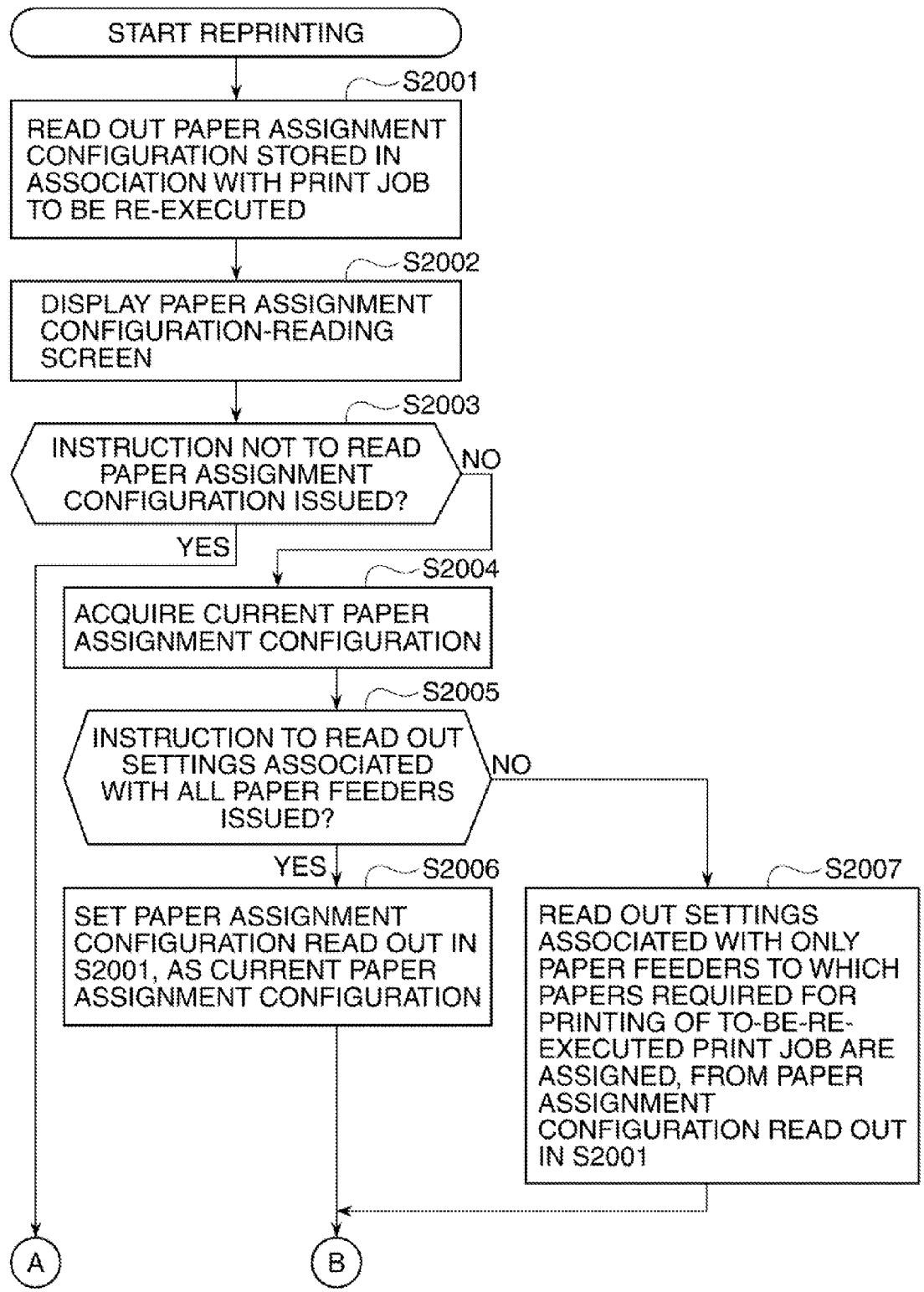
FIGS. 20A and 20B are a flowchart of a print job reprinting process executed by a printing apparatus according to the fifth embodiment.
Figure 20B:
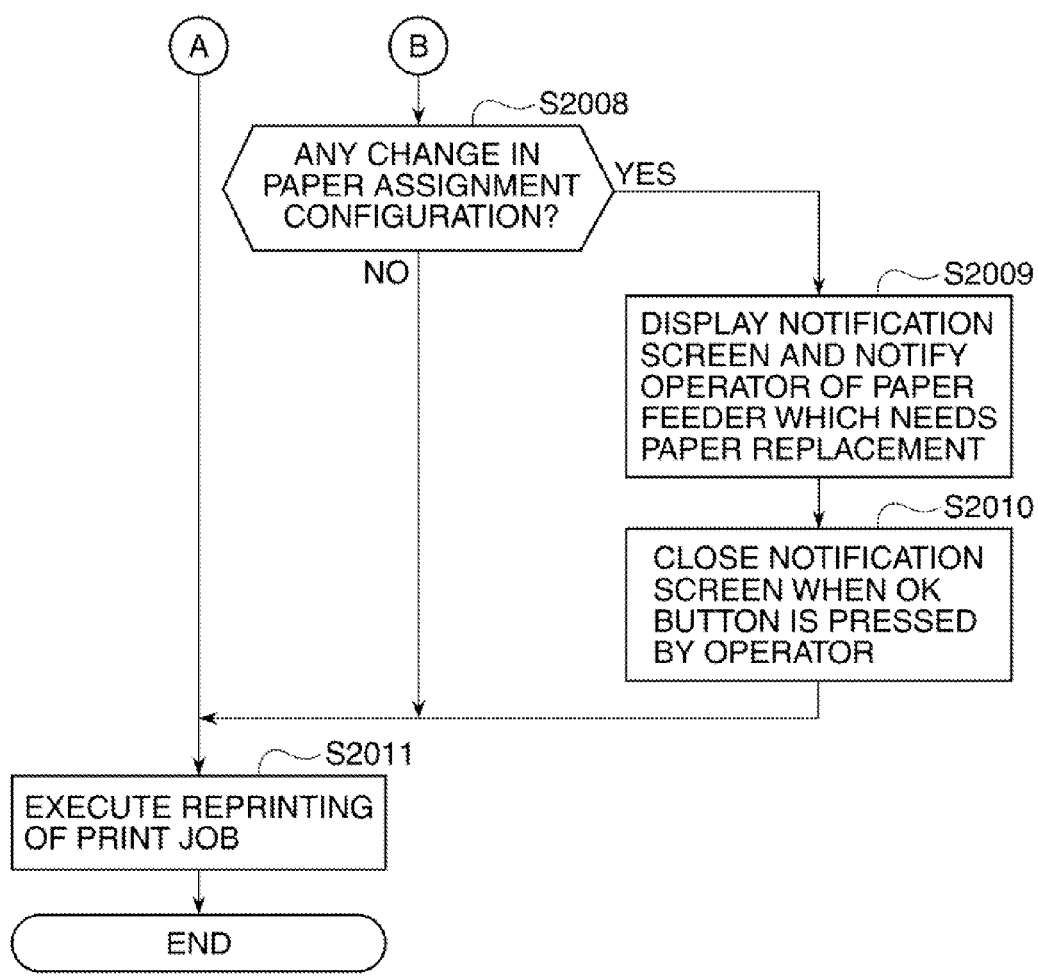

FIGS. 20A and 20B are a flowchart of a print job reprinting process executed by the CPU 114 of the printing apparatus according to the fifth embodiment.

When reprinting is started, the CPU 114 reads out from the HDD 115 a paper assignment configuration held in the completed print job queue 1310 in association with a print job to be re-executed (step S2001). Next, the CPU 114 displays the reprinting print job screen 1900 and receives an instruction concerning reading of paper assignment settings from the operator (step S2002).

Then, the CPU 114 determines whether or not the operator has issued an instruction not to read paper assignment settings (step S2003). This determination is performed based on whether or not the check box 1912 has been selected. If it is determined in the step S2003 that the operator has issued the instruction not to read paper assignment settings (YES to the step S2003), the CPU 114 proceeds to a step S2011. On the other hand, if it is determined in the step S2003 that the operator has not issued the instruction not to read paper assignment settings (NO to the step S2003), the CPU 114 acquires the current paper assignment configuration set in the printing apparatus 110 (step S2004).

Next, the CPU 114 determines whether or not the operator has designated reading of all the paper assignment settings associated with the respective paper feeders (step S2005). This determination is performed based on whether or not the check box 1914 has been selected. If it is determined in the step S2005 that the operator has designated reading of all the paper assignment settings associated with the respective paper feeders (YES to the step S2005), the CPU 114 proceeds to a step S2006. On the other hand, if it is determined in the step S2005 that the operator has not designated reading of all the paper assignment configurations associated with the respective paper feeders (NO to the step S2005), the CPU 114 proceeds to a step S2007.

In the step S2006, the CPU 114 sets the paper assignment configuration read out in the step S2001 as the current paper assignment configuration, and then the CPU 114 proceeds to a step S2008.

In the step S2007, the CPU 114 reads out from the paper assignment configuration read out in the step S2001 only paper assignment settings associated with paper feeders to which papers (paper types) necessary for reprinting of the print job are assigned, and then the CPU 114 proceeds to the step S2008.

In the step S2008, the CPU 114 compares between the paper assignment configuration acquired in the step S2004 and the paper assignment setting read out in the step S2006 or S2007, to thereby determine whether or not there is any change in paper assignment configuration. If it is determined in the step S2008 that there is no change in paper assignment configuration (NO to the step S2008), the CPU 114 proceeds to the step S2011. On the other hand, if it is determined in the step S2008 that there is any change in paper assignment configuration (YES to the step S2008), the CPU 114 displays the notification screen 1101 on the console section 120 to notify the operator of the paper feeder(s) requiring paper replacement (step S2009). Thereafter, when the OK button 1120 is pressed by the operator, the CPU 114 closes the notification screen 1101 (step S2010), and then the CPU 114 proceeds to the step S2011.

In the step S2011, the CPU 114 executes printing of the print job to be re-executed (step S2011), followed by terminating the sequential processing.

According to the above-described fifth embodiment, in the case of re-executing a completed print job, the operator is prompted to select whether or not to read out a previously set paper assignment configuration. Further, in the case of reading out the paper assignment configuration, the operator is prompted to select whether or not to read out only paper assignment settings associated with paper feeders to which papers (paper types) necessary for reprinting of the print job are assigned. Thus, only a paper assignment setting/paper assignment settings associated with a paper feeder/paper feeders is/are selected, as required, according to an instruction from the operator, and hence it is possible to reduce time and labor required for paper assignment configuration to thereby improve user-friendliness.

Although in the above-described first to fifth embodiments, the printing apparatus 110 receives a paper assignment configuration, the host computer 101 may receive the paper assignment configuration. In this case, the control process for configuring paper assignment may be executed using a driver or an application.

Further, a method may be employed in which in a case where another job is being executed when a paper assignment configuration is read out, only a paper feeder/paper feeders for which paper replacement can be executed may be displayed for guidance, and the other paper feeders may be kept on standby until paper replacement can be executed.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims priority from Japanese Patent Application No. 2012-130676 filed Jun. 8, 2012, which is hereby incorporated by reference herein in its entirety.

What is claimed is:

1. A printing apparatus provided with a plurality of paper feeders for containing papers, comprising:
    a processing unit configured to execute a print job;
    a setting unit configured to set information on types of papers contained in the respective paper feeders, as a paper assignment configuration;
    a storage unit configured to store paper assignment configurations set by said setting unit;
    a display unit configured to display a history screen for displaying completed print jobs, based on information stored by said storage unit; and
    a selection unit configured to select a specific paper assignment configuration, based on a user instruction, from the paper assignment configurations stored in said storage unit,
    wherein said selection unit selects a paper assignment configuration associated with a completed print job selected by the user on the history screen, as the specific paper assignment configuration,
    wherein said setting unit sets the specific paper assignment configuration selected by said selection unit, as a current paper assignment configuration, and
    wherein said storage unit stores a paper assignment configuration set when executing the print job by said processing unit, in association with information on the print job.

2. The printing apparatus according to claim 1, further comprising:
    a determination unit configured to determine, based on the current paper assignment configuration and the specific paper assignment configuration selected by said selection unit, whether or not there is a paper feeder which needs paper replacement; and
    a notification unit configured to, when said determination unit determines that there is a paper feeder which needs paper replacement, notify a user to perform paper replacement.

3. The printing apparatus according to claim 2, wherein said notification unit sends information on the paper feeder which needs paper replacement and a type of papers to be contained in the paper feeder to the user.

4. The printing apparatus according to claim 1, wherein said selection unit selects a paper assignment configuration associated with a completed print job which is designated for re-execution by the user on the history screen, as the specific paper assignment configuration.

5. The printing apparatus according to claim 1, wherein said setting unit extracts only assignment settings associated with a type of papers used for execution of the print job, from the specific paper assignment configuration selected by said selection unit, and sets the extracted assignment settings as settings of the current paper assignment configuration.

6. The printing apparatus according to claim 1, wherein said storage unit stores a paper assignment configuration set when said processing unit starts execution of a print job, in association with information on the print job, and when the paper assignment configuration is changed during execution of the print job, said storage unit stores a changed paper assignment configuration in association with the information on the print job.

7. The printing apparatus according to claim 1, wherein said storage unit stores a paper assignment configuration using a name designated by the user.

8. The printing apparatus according to claim 1, wherein the information on the type of papers includes at least a paper name and a paper size.

9. A method of controlling a printing apparatus provided with a plurality of paper feeders for containing papers, comprising:
    executing a print job;
    setting information on types of papers contained in the respective paper feeders, as a paper assignment configuration;
    storing paper assignment configurations in a storage unit;
    displaying a history screen for displaying completed print jobs, based on information stored by said storage unit;
    selecting a specific paper assignment configuration, based on a user instruction, from the paper assignment configurations stored in the storage unit; and
    setting the specific paper assignment configuration selected by said selecting, as a current paper assignment configuration,
    wherein selecting the specific paper assignment configuration comprises selecting a paper assignment configuration associated with a completed print job selected by the user on the history screen, as the specific paper assignment configuration, and
    wherein storing paper assignment configurations comprises storing a paper assignment configuration set when executing the print job by said processing unit, in association with information on the print job.

10. A non-transitory computer-readable storage medium storing a computer-executable program for causing a computer to execute a method of controlling a printing apparatus provided with a plurality of paper feeders for containing papers,
    wherein the method comprises:
    executing a print job;
    setting information on types of papers contained in the respective paper feeders, as a paper assignment configuration;
    storing paper assignment configurations in a storage unit;
    displaying a history screen for displaying completed print jobs, based on information stored by said storage unit;
    selecting a specific paper assignment configuration, based on a user instruction, from the paper assignment configurations stored in the storage unit; and setting the specific paper assignment configuration selected by said selecting, as a current paper assignment configuration, wherein selecting the specific paper assignment configuration comprises selecting a paper assignment configuration associated with a completed print job selected by the user on the history screen, as the specific paper assignment configuration, and wherein storing paper assignment configurations comprises storing a paper assignment configuration set when executing the print lob by said processing unit, in association with information on the print job.

* * * * *